US007926800B2

(12) United States Patent
Oikawa et al.

(10) Patent No.: US 7,926,800 B2
(45) Date of Patent: Apr. 19, 2011

(54) SHEET PROCESSING APPARATUS AND IMAGE FORMING APPARATUS

(75) Inventors: Atsuteru Oikawa, Kawasaki (JP); Kenichi Hayashi, Abiko (JP); Kenichi Tamura, Toride (JP); Takashi Sugiura, Kashiwa (JP); Hitoshi Kato, Toride (JP); Wataru Kawata, Kashiwa (JP); Keiko Fujita, Kashiwa (JP); Youichi Chikugo, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 11/760,502

(22) Filed: Jun. 8, 2007

(65) Prior Publication Data

US 2007/0284799 A1 Dec. 13, 2007

(30) Foreign Application Priority Data

Jun. 9, 2006 (JP) ................................ 2006-161536

(51) Int. Cl.

| | |
|---|---|
| ***B41L 43/00*** | (2006.01) |
| ***B41L 43/12*** | (2006.01) |
| ***B65G 33/04*** | (2006.01) |
| ***B65G 39/00*** | (2006.01) |

(52) U.S. Cl. ...... 270/58.12; 270/32; 270/37; 270/58.08; 270/58.17; 270/58.27

(58) Field of Classification Search .................... 270/32, 270/37, 58.08, 58.12, 58.17, 58.27
See application file for complete search history.

(56) References Cited

U.S. PATENT DOCUMENTS

| | | | |
|---|---|---|---|
| 4,883,265 A | 11/1989 | Iida | |
| 5,108,082 A | 4/1992 | Shea | |
| 5,335,005 A | 8/1994 | Sellers | |
| 6,868,253 B2 * | 3/2005 | Ueda et al. | 399/407 |
| 7,207,557 B2 * | 4/2007 | Kaneko et al. | 270/58.08 |
| 7,416,177 B2 * | 8/2008 | Suzuki et al. | 270/37 |
| 2003/0227121 A1 * | 12/2003 | Yamakawa et al. | 270/37 |
| 2004/0247356 A1 | 12/2004 | Kaneko | |
| 2005/0062208 A1 * | 3/2005 | Wakabayashi et al. | 270/32 |
| 2006/0012098 A1 * | 1/2006 | Kaneko | 270/37 |
| 2006/0153612 A1 * | 7/2006 | Saitsu et al. | 399/410 |
| 2007/0009298 A1 * | 1/2007 | Nagasawa et al. | 399/410 |

FOREIGN PATENT DOCUMENTS

| | | |
|---|---|---|
| JP | 11-078287 A | 3/1999 |
| JP | 2002-331730 A | 11/2002 |

* cited by examiner

*Primary Examiner* — Gene Crawford
*Assistant Examiner* — Yolanda Cumbess
(74) *Attorney, Agent, or Firm* — Canon USA Inc IP Div

(57) ABSTRACT

A sheet processing apparatus includes an aligning member configured to align an end of a bundle of sheets including a folded sheet by engaging with the edge of the bundle of sheets, and a sheet processing unit configured to process the bundle of sheets having the end aligned by the aligning member. The end of the bundle of sheets engaged with the aligning member is opposite to a folded portion of the folded sheet.

20 Claims, 18 Drawing Sheets

SHEET PROCESSING APPARATUS AND IMAGE FORMING APPARATUS

BACKGROUND OF THE INVENTION

1. Field of the Invention

The present invention relates to a sheet processing apparatus for an image forming apparatus.

2. Description of the Related Art

Image forming apparatuses, such as copying machines and laser printers, which are equipped with a sheet processing apparatus are known. The sheet processing apparatus receives sheets discharged from the image forming apparatus after image formation, and performs saddle stitching and book binding by subjecting the sheets to operations, such as for example, center folding, binding almost the centers of the sheets, and folding the sheets in two.

An example of a sheet processing apparatus includes a compact, space-saving, and low-cost book binding device. In order to bind a bundle of sheets, the book binding device first conveys sheets, which have been supplied one by one from a main unit of an image forming apparatus, into a storage guide so that the sheets are stored therein in a substantially vertical position.

The sheets are positioned by bringing leading ends of the sheets into contact with a sheet positioning member that is placed at a predetermined binding position, are aligned in the width direction, and are then saddle-stitched at the center by a stapler. Subsequently, the sheets are folded at the center by a thrust plate and folding rollers so as to make a booklet. The booklet formed by a bundle of sheets is discharged onto an output tray from an output port provided on a discharge side of the folding rollers in a manner such that the folded portion of the booklet is at the forefront (as described, for example, in Japanese Patent Laid-Open No. 2002-331730).

Japanese Patent Laid-Open No. H11-78287 discloses another binding device. In this binding device, a sheet larger than a bundle of sheets is folded into a foldout having the same size as that of the bundle of sheets, and the foldout, a cover sheet, and a bundle of sheets corresponding to one booklet are bound together such that the foldout is provided between the cover sheet and the bundle of sheets. That is, a bundle of sheets including a folded sheet is folded and bound to make a booklet.

In the above-described sheet processing apparatus and the image forming apparatus disclosed in Japanese Patent Laid-Open No. 2002-331730, for example, when a bundle of sheets including a folded sheet is processed (e.g., subjected to book binding), it needs to be aligned. If the folding accuracy of the folded sheet is low, the accuracy in aligning the bundle of sheets and the folded sheet may be decreased. That is, the aligning accuracy may decrease depending on the folding accuracy of the folded sheet. That is, in a case in which the folding accuracy of the folded sheet is low, when an aligning member touches a folded portion of the folded sheet, the aligning accuracy of the entire bundle of sheets including the folded sheet may be decreased.

For example, if the bundle of sheets is subjected to book binding while the ends of the sheets are not aligned properly, the quality of a booklet obtained by book binding is lowered.

SUMMARY OF THE INVENTION

The present invention provides a sheet processing apparatus and an image forming apparatus that achieve high-quality processing of a bundle of sheets including a folded sheet.

A sheet processing apparatus according to an aspect of the present invention includes an aligning member configured to align the edges at one end of a bundle of sheets including a folded sheet by engaging with the edges of the bundle of sheets; and a sheet processing unit configured to process the bundle of sheets aligned by the aligning member, wherein the end of the bundle of sheets having the edges engaged with the aligning member is opposite to a folded portion of any folded sheet.

According to the present invention, an end of a bundle of sheets including a folded sheet opposite to a folded portion of the folded sheet comes into contact with the aligning member. Therefore, the aligning accuracy of the bundle of sheets including the folded sheet is not decreased by the influence of the folded portion, and high-quality processing of the bundle of sheets can be achieved.

Further features of the present invention will become apparent from the following description of exemplary embodiments with reference to the attached drawings.

DESCRIPTION OF THE EMBODIMENTS

A preferred embodiment of the present invention will be described in detail below with reference to the drawings.

Figure 1:
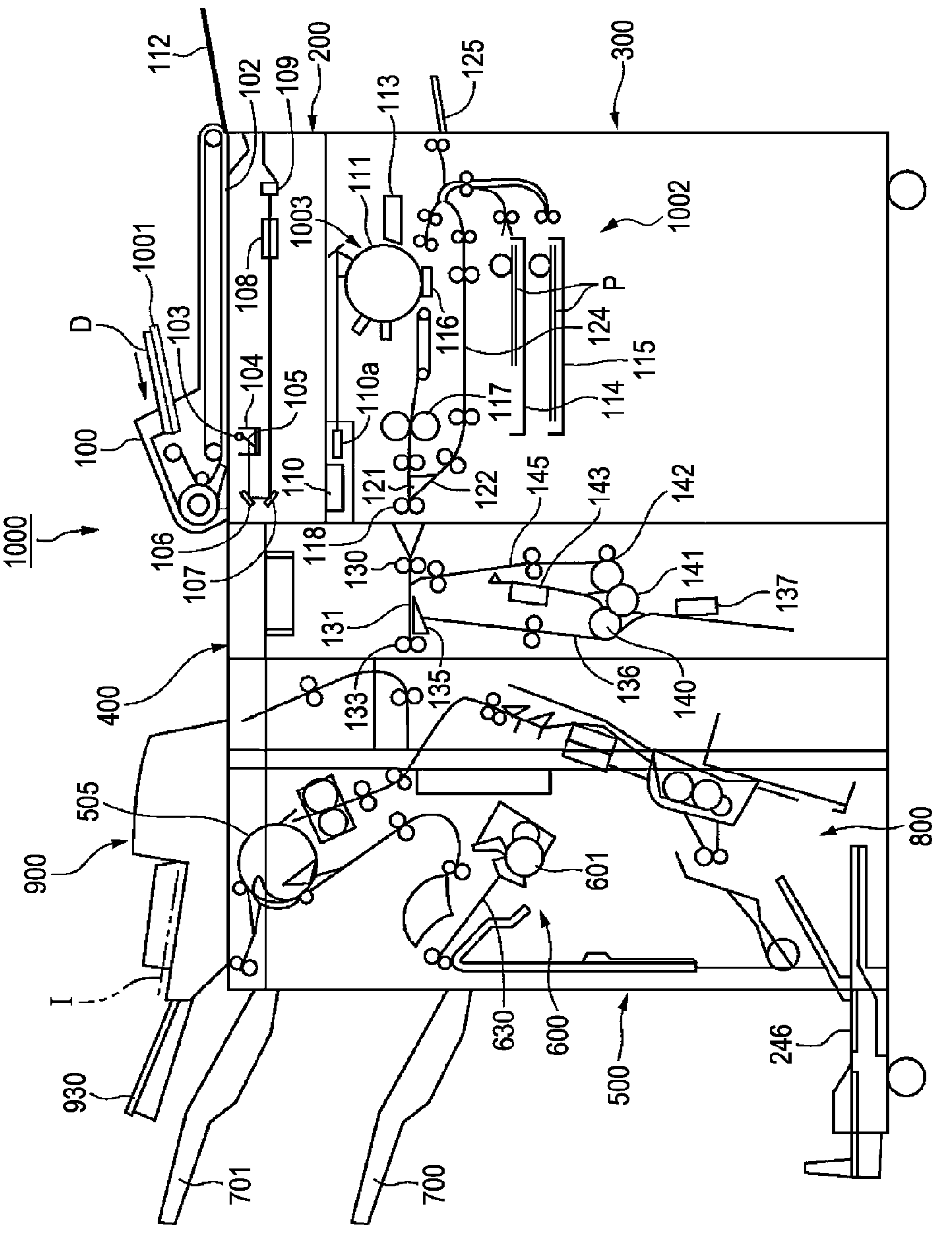
FIG. 1 is a cross-sectional view of a copying machine as an example of an image forming apparatus including a sheet processing apparatus according to an embodiment of the present invention.

FIG. 1 is a cross-sectional view of a copying machine as an example of an image forming apparatus equipped with a sheet processing apparatus according to an embodiment of the present invention.

Referring to FIG. 1, a copying machine 1000 includes a main unit 300 and a scanner 200 provided on an upper surface of the main unit 300.

The scanner 200 reads a document, and includes a document feeder 100, a scanner unit 104, a lens 108, and an image sensor 109. In order to read documents D with the scanner 200, the documents D are first set on a tray 1001 of the document feeder 100. In this case, the documents D are set face up on the tray 1001 such that image bearing surfaces of the documents D face up.

The set documents D are fed one by one from the first page in a leftward direction (a direction shown by the arrow in FIG. 1) by the document feeder 100. A fed document D is conveyed from left to right on a platen glass 102 via a curved path, and is then discharged onto an output tray 112.

During so-called document flow reading, the scanner unit 104 is held at a predetermined position, and the document D is read while passing over the scanner unit 104 from left to right. When the document D passes over the platen glass 102 during this reading, light is applied from a lamp 103 of the scanner unit 104 onto the document D, and the light reflected by the document D is guided to the image sensor 109 via mirrors 105, 106, and 107 and the lens 108. Image data read from the document D by the image sensor 109 is subjected to predetermined image processing, and is transmitted to an exposure controller 110.

In contrast, during so-called document fixed reading, the document D conveyed by the document feeder 100 is temporarily stopped on the platen glass 102. In this state, the scanner unit 104 is moved from left to right in order to read the document D. When document reading is performed without using the document feeder 100, a user raises the document feeder 100, and sets a document on the platen glass 102.

The main unit 300 of the copying machine 1000 includes a sheet feeding unit 1002 that feeds sheets P stored in cassettes 114 and 115, and an image forming unit 1003 that forms images on the sheets P fed by the sheet feeding unit 1002.

The image forming unit 1003 includes a photosensitive drum 111, a developing device 113, and a transfer charger 116. During image formation, laser light is applied from the exposure controller 110 onto the photosensitive drum 111, so that a latent image is formed on the photosensitive drum 111. The latent image is then visualized as a toner image by the developing device 113. A fixing device 117 and a pair of discharging rollers 118 are provided downstream of the image forming unit 1003.

A description will now be given of an image forming operation of the main unit 300 having the above-described configuration.

As described above, during document flow reading or document fixed reading with the scanner 200, image data of a document D read by the image sensor 109 is subjected to predetermined image processing, and is then transmitted as image signals to the exposure controller 110. The exposure controller 110 outputs laser light according to the image signals corresponding to the image data.

The laser light is applied onto the photosensitive drum 111 while being scanned by a polygonal mirror 110*a*, and an electrostatic latent image in accordance with the scanned laser light is formed on the photosensitive drum 111. Subsequently, the electrostatic latent image is developed into a visual toner image by the developing device 113.

On the other hand, a sheet P is conveyed from any of the cassettes 114 and 115, a manual sheet feeder 125, and a conveying path 124 for two-sided printing to a transfer unit constituted by the photosensitive drum 111 and the transfer charger 116. In the transfer unit, the visual toner image on the photosensitive drum 111 is transferred onto the sheet P. The transferred image on the sheet P is fixed by the fixing device 117.

Subsequently, the sheet P passing through the fixing device 117 is temporarily guided to a path 122 by a flapper 121, and is switched back after a leading edge thereof passes through the flapper 121. The sheet P is then conveyed to the discharging rollers 118 by the flapper 121, and is discharged from the main unit 300. Consequently, the sheet P can be discharged face down from the main unit 300 in a manner such that a surface of the sheet P having the toner image faces down.

In a case in which images are sequentially formed on sheets P from the first page and the sheets P are discharged face down by this so-called reverse discharging, for example, when image formation is performed with the document feeder 100, the sheets P can be discharged in the right page order. When image formation is performed according to image data output from a computer, sheets P are also discharged in the right page order.

When an image is formed on a hard sheet, such as an OHP sheet, conveyed from the manual sheet feeder 125, the sheet is not guided to the path 122, but is discharged face up from the main unit 300 by the discharging rollers 118 in a manner such that a surface of the sheet having a toner image faces up.

When an image is formed on each side of a sheet, the sheet is directly guided from the fixing device 117 toward the discharging rollers 118, is switched back immediately after the rear edge of the sheet passes through the flapper 121, and is then conveyed to the conveying path 124 for two-sided printing by the flapper 121.

The main unit 300 is equipped with a folding unit 400 for folding sheets discharged from the main unit 300 after image formation, and a finisher 500 for stitching and binding the sheets. The folding unit 400 and the finisher 500 constitute a sheet processing apparatus.

The folding unit 400 and the finisher 500 will now be described.

Figure 2:
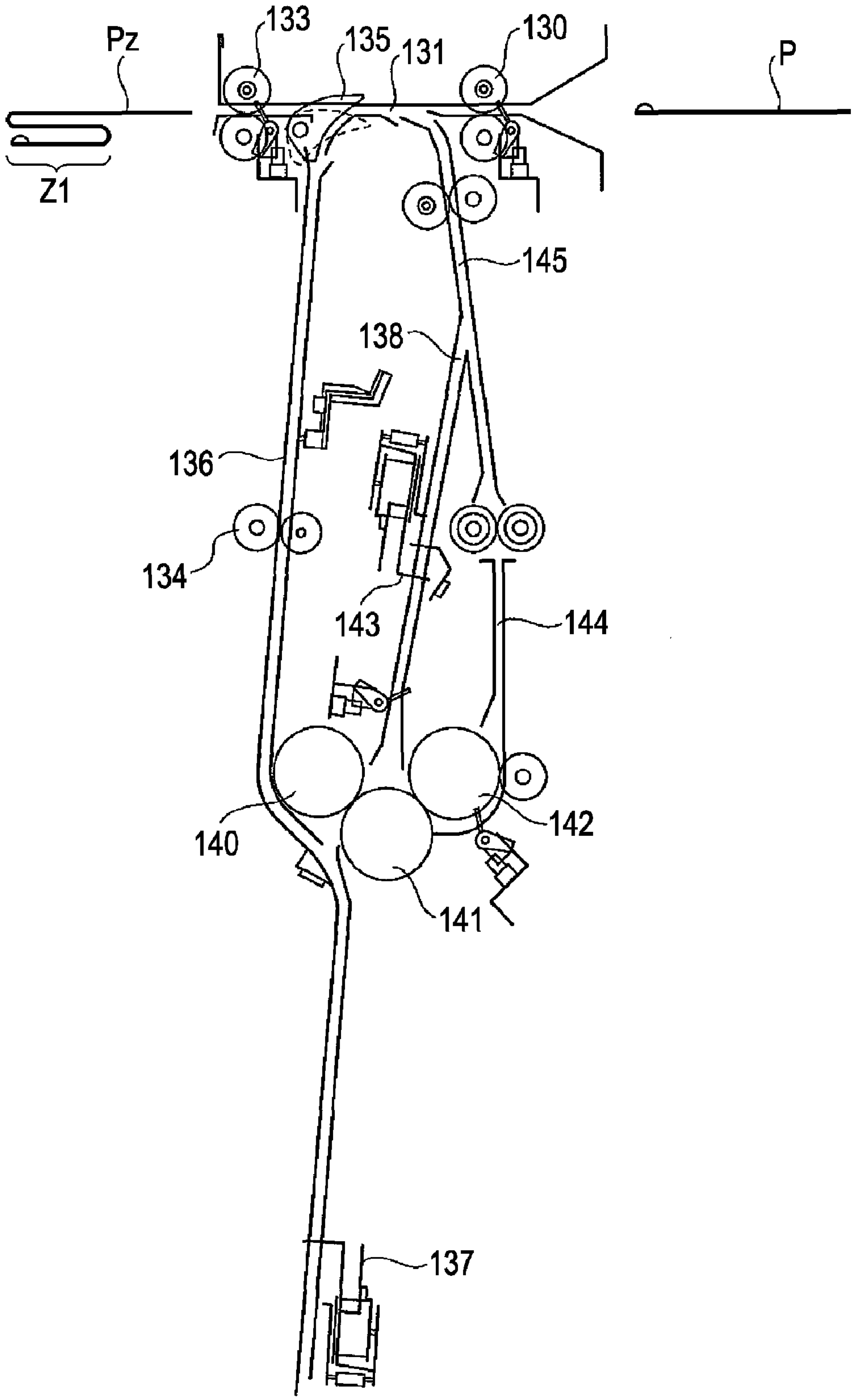
FIG. 2 is an explanatory view showing a configuration of a folding unit provided in the sheet processing apparatus.

As shown in FIGS. 1 and 2, the folding unit 400 includes a conveying path 131 through which a sheet P discharged from the main unit 300 is received and guided to the finisher 500. Pairs of conveying rollers 130 and 133 are provided on the conveying path 131. A switching flapper 135 is provided near the conveying rollers 133, and guides the sheet P conveyed by the conveying rollers 130 to a folding path 136 or the finisher 500.

While the sheet P discharged from the main unit 300 is directly conveyed into the finisher 500 via the conveying path 131 in normal cases, when the sheet P needs to be folded, it is guided to the folding path 136 by switching the switching flapper 135 to the folding path 136. In this embodiment, the folding unit 400 can operate in a Z-shaped folding mode, an upward C-shaped folding mode, and a downward C-shaped folding mode.

A folding operation of the folding unit 400 will now be described.

Figures 3A, 3B, 3C:
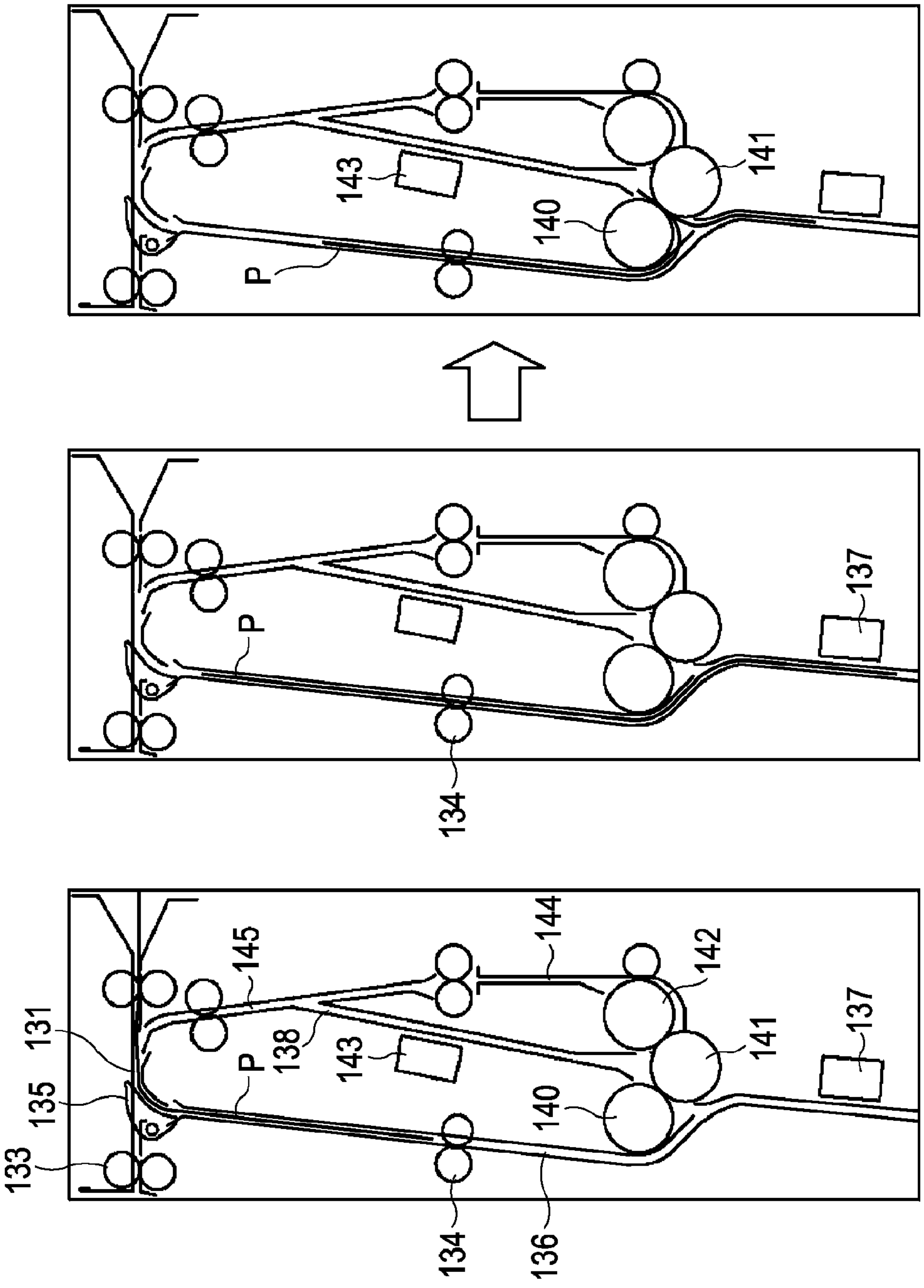
FIGS. 3A to 3F are explanatory views showing a Z-shaped folding operation of the folding unit.

In a Z-shaped folding mode, a sheet P discharged from the main unit 300 is first conveyed into the folding path 136 of the folding unit 400, as shown in FIG. 3A. Then, the edge of one end of the sheet P is abutted against a leading-edge receiving stopper 137 by a pair of conveying rollers 134, as shown in FIG. 3B.

Figure 3F:
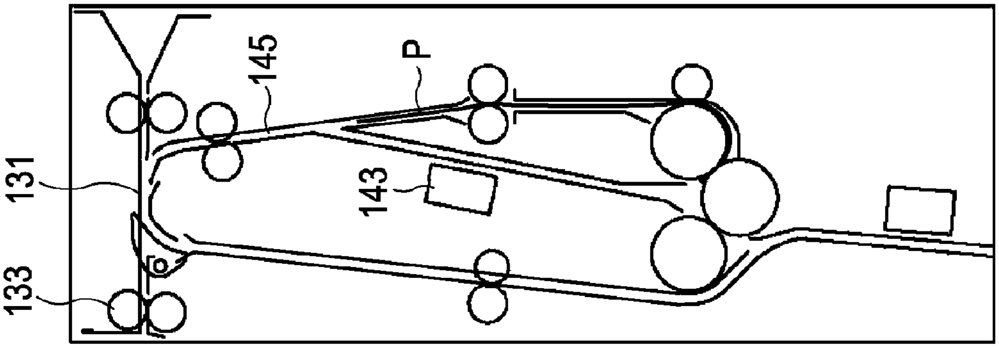

Subsequently, when an upper potion of the sheet P is downwardly pushed by the conveying rollers 134 with reference to this position, the sheet P is curved because a lower end of the sheet P is stopped by the leading-edge receiving stopper 137. The curved portion is proceeded into the nip of the first and second folding rollers 140 and 141. Thereafter the sheet P is folded once by the first and second folding rollers 140 and 141, as shown in FIG. 3C. The distance from the leading edge of the sheet P to a folded portion is equal to one-fourth of the length of the sheet P in the conveying direction. The folded portion of the sheet P is then abutted against a folded-portion receiving stopper 143, as shown in FIG. 3D.

Figure 3E:
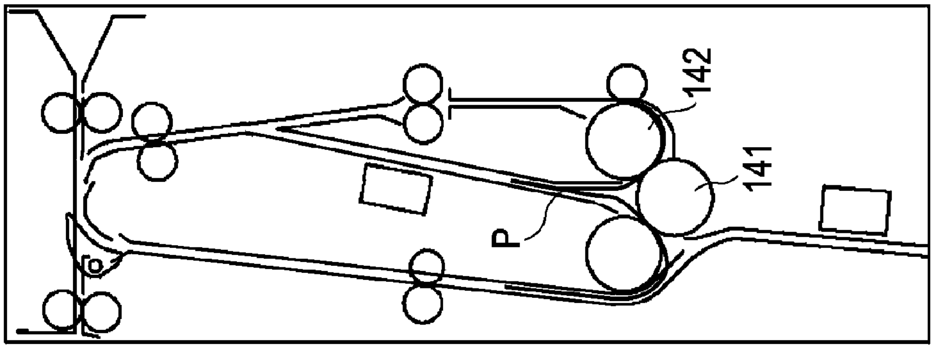
Figure 3D:
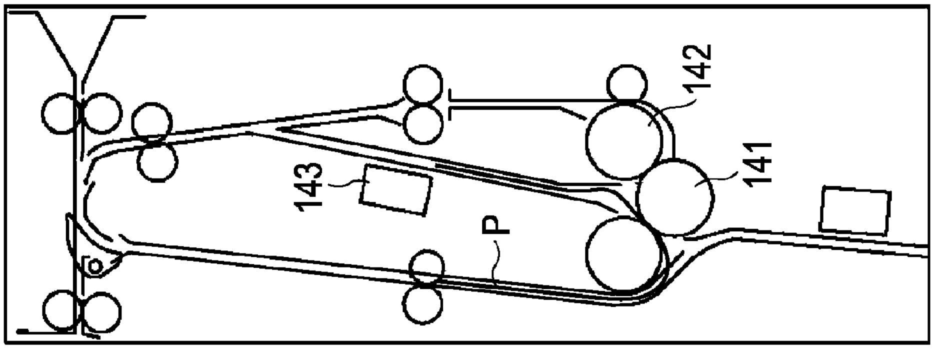

With reference to this position, the sheet P is folded back in a direction opposite to the previous folding direction by the second folding roller 141 and a third folding roller 142, as shown in FIG. 3E. When the sheet P is upwardly pushed by the first and second folding rollers 140 and 141, the sheet P is curved because the upper end of the sheet P (the folded portion of the sheet P) is stopped by the folded-portion receiving stopper 143. The curved portion is proceeded into the nip of the second folding roller 141 and the third folding roller 142. Thereafter the sheet P is folded once by the second folding roller 141 and the third folding roller 142. The distance from this folded portion to the previous folded portion is equal to one-fourth of the length of the sheet P in the conveying direction. In this way, the sheet P is folded twice in the Z-shaped folding mode, that is, the sheet P is first folded at the portion at a distance from the leading edge equal to one-fourth of the length of the sheet P, and is then folded at the portion at a distance from the previous folded portion equal to one-fourth of the length, so that the sheet P is folded in three in a Z-shape, and the size of the Z-shaped folded sheet P is just equal to half the initial size of the sheet P. The shape of a sheet Pz folded in a Z-shape is shown in the upper left side of FIG. 2. The sheet Pz includes a folded portion Z1 formed by the first and second folding steps.

After folded in a Z-shape in this way, the sheet P is conveyed to the conveying path 131 through conveying paths 144 and 145, as shown in FIG. 3F, and is discharged to (a saddle stitching unit 800 of) the downstream finisher 500 by the conveying rollers 133. In this Z-shaped folding mode, the sheet P is not reversed by the folding operation, as shown in FIG. 2.

Figure 4:
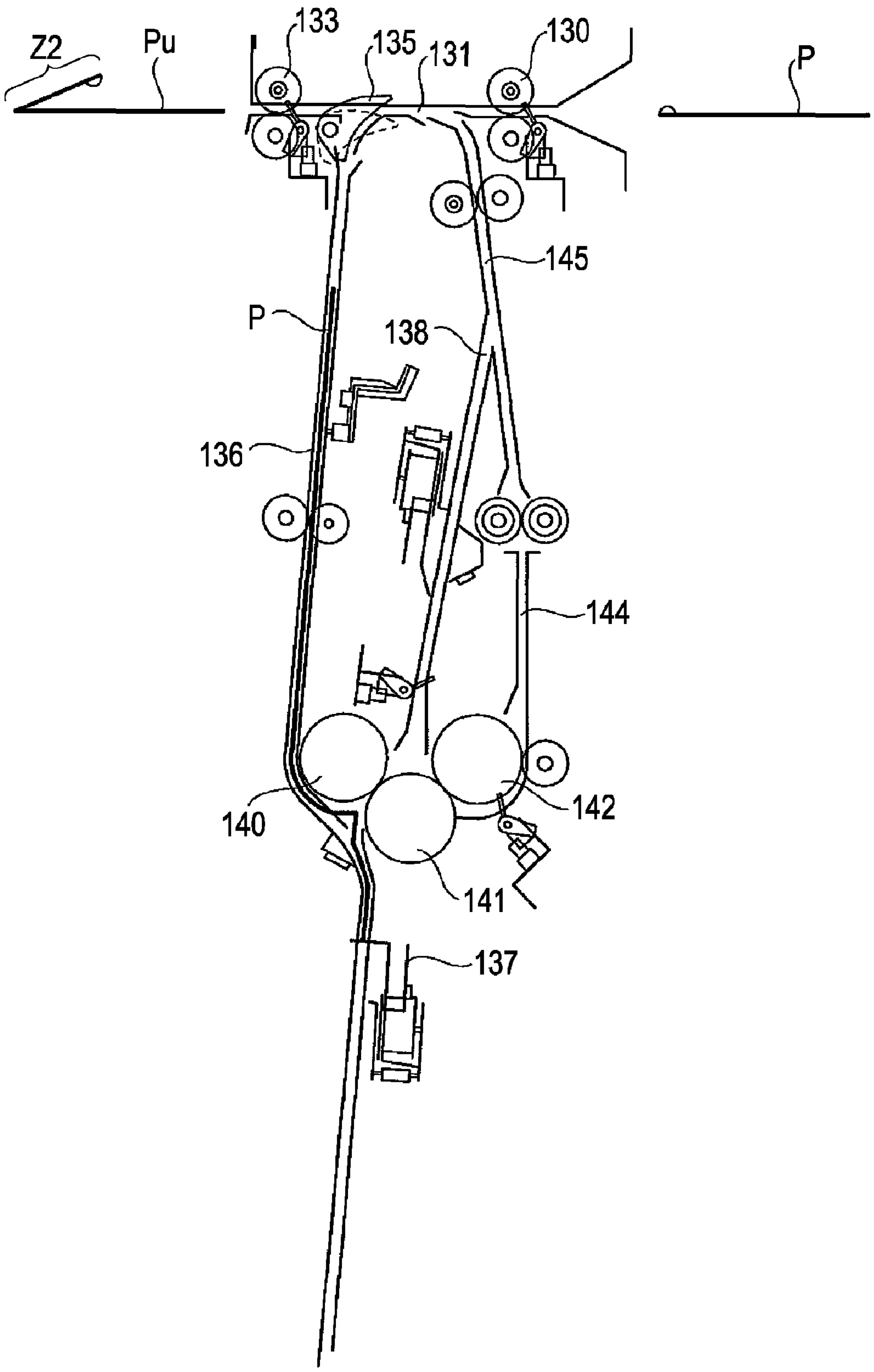
FIG. 4 is an explanatory view showing an upward C-shaped folding operation of the folding unit.

In an upward C-shaped folding mode, as shown in FIG. 4, a loop is formed by abutting a leading edge of a sheet P conveyed in the conveying path 136 against the stopper 137, and is folded by the folding rollers 140 and 141. The folded sheet P is then conveyed to the conveying path 131 via a conveying path 138 and the conveying path 145, and is discharged to (the saddle stitching unit 800 of) the downstream finisher 500 by the conveying rollers 133. The shape of a sheet Pu folded in an upward C-shape is shown in the upper left side of FIG. 4. The sheet Pu includes a portion Z2 folded back by the folding rollers 140 and 141.

When the sheet P is thus folded in an upward C-shape, the folded part is turned upside down by the folding operation. Since the upward C-shaped folded sheet P is reversed when put into the saddle stitching unit 800, as will be described below, it is necessary to change an image forming position on the sheet beforehand so that the leading end and the rear end of the sheet change places with each other. Further, since the stopper 137 is movable, the user can adjust the folding position by changing the standby position of the stopper 137.

Figure 5:
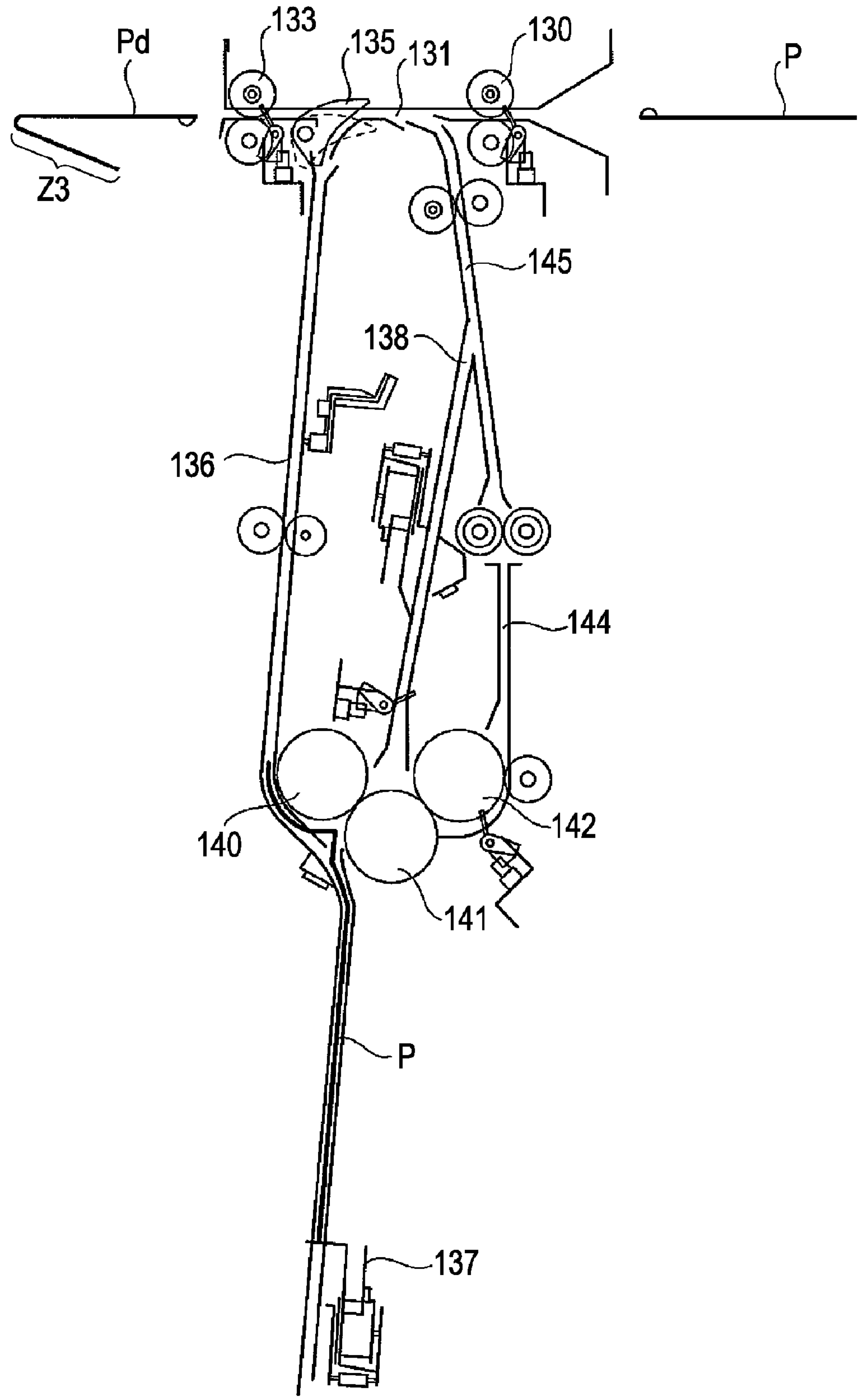
FIG. 5 is an explanatory view showing a downward C-shaped folding operation of the folding unit.

In a downward C-shaped folding mode, as shown in FIG. 5, a loop is formed by abutting a leading edge of a sheet P conveyed in the conveying path 136 against the stopper 137, and is folded by the folding rollers 140 and 141. The folded sheet P is then conveyed to the conveying path 131 via the conveying paths 138 and 145, and is discharged to (the saddle stitching unit 800 of) the downstream finisher 500 by the conveying rollers 133. The shape of a sheet Pd folded in a downward C-shape is shown in the upper left side of FIG. 5. The sheet Pd includes a portion Z3 folded back by the folding rollers 140 and 141.

When the sheet P is thus folded in a downward C-shape, it is turned upside down by the folding operation, and the initial leading edge is placed at the tail end. Since the downward C-shaped folded sheet is reversed when put into the saddle stitching unit 800, as will be described below, it is unnecessary to change an image forming position on the sheet. Further, since the stopper 137 is movable, the user can adjust the folding position by changing the standby position of the stopper 137.

The finisher 500 receives a plurality of sheets from the main unit 300, and subjects the sheets to operations, such as aligning the sheets in a bundle, sorting, and non-sorting. The finisher 500 also performs stapling for stapling the sheet bundle at a rear end, and book binding. The finisher 500 includes a stapling unit 600 for stapling the sheets, and a saddle stitching unit 800 serving as a book binding unit for folding the sheet bundle in two so as to make a booklet.

Figure 6:
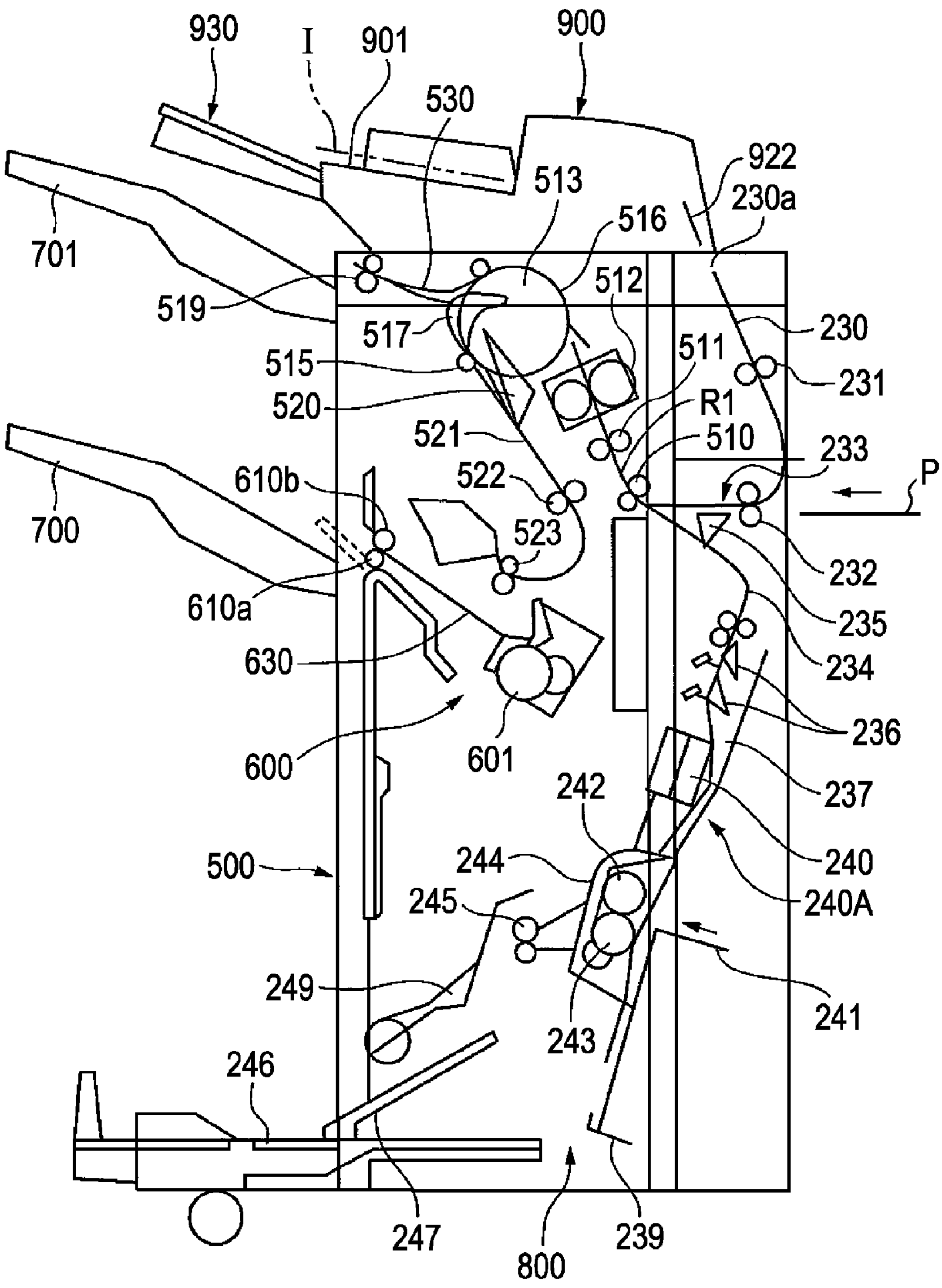
FIG. 6 is a schematic view showing a configuration of the sheet processing apparatus.

As shown in FIG. 6, the finisher 500 also includes a pair of input rollers 232 for receiving a sheet conveyed into the finisher 500 via the folding unit 400. A switching flapper 235 is provided downstream of the input rollers 232 so as to guide the sheet to a finisher path R1 or a book binding path 234 disposed therebelow.

For example, when a sheet P is guided to the finisher path R1 by the switching flapper 235, it is conveyed toward a buffer roller 513 via pairs of conveying rollers 510 and 511. A punching unit 512 is provided between the conveying rollers 511 and the buffer roller 513. By operating the punching unit 512 as necessary, holes are punched adjacent the rear edge of the sheet P conveyed via the conveying rollers 510 and 511.

The pairs of conveying rollers 510 and 511 are rotatable clockwise and anticlockwise, and thus can convey the sheet toward the buffer roller 513 and in the opposite direction. The switching flapper 235 and the pairs of conveying rollers 510 and 511 constitute a reversing unit 233 that reverses and conveys the sheet.

A predetermined number of sheets conveyed via the pairs of conveying rollers 510 and 511 can be wound around the buffer roller 513. During rotation of the buffer roller 513, the sheets are wound by a pressing roller 515. Consequently, the sheets are conveyed in the rotating direction of the buffer roller 513.

A buffer path 516 is provided on the periphery of the buffer roller 513. A switching flapper 517 is provided in the buffer path 516, and a switching flapper 520 is provided below the switching flapper 517.

The switching flapper 517 separates the sheet from the buffer roller 513, and guides the sheet to a non-sorting path 530 near a sample tray 701, or to a sorting path 521. The sheet guided to the non-sorting path 530 by the switching flapper 517 is discharged onto the sample tray 701 via a pair of discharging rollers 519.

The switching flapper 520 separates the sheet from the buffer roller 513, and guides the sheet to the sorting path 521, or guides the sheet to the buffer path 516 in a state in which the sheet is still wound on the buffer roller 513.

Sheets guided to the sorting path 521 by the switching flapper 520 are stacked in a bundle on a processing tray 630 serving as an intermediate tray via pairs of conveying rollers 522 and 523. The sheets stacked on the processing tray 630 are aligned and stapled according to the setting made by an operating unit 10 shown in FIG. 8, which will be described below, and are then discharged onto a stacking tray 700 via discharging rollers 610*a* and 610*b*. Stapling is performed by a stapler 601 that can move up and down.

When sheets are guided to the book binding path 234 by the switching flapper 235, a delivery port is selected by flappers 236 according to the size of the sheets, and the sheets are delivered into an inclined or substantially vertical storage guide 237 serving as a sheet storage portion in the saddle stitching unit 800.

At an upper end of the storage guide 237, a stapling unit 240A is provided. The stapling unit 240A includes two pairs of staplers 240, and an anvil (not shown) that staples the sheets at the center in cooperation with the staplers 240.

Downstream of the stapling unit 240A, a width-direction aligning member or plate 244 is provided to align the bundle of sheets stored in the storage guide 237 in the width direction. A pair of folding rollers 242 and 243 and a thrust member 241 are also provided downstream of the stapling unit 240A. The folding rollers 242 and 243 constitute a folder that folds the sheet bundle stored in the storage guide 237. The thrust member 241 is thrust against the stored sheet bundle.

A sheet positioning member 239 is provided at a lower end of the storage guide 237. The sheet positioning member 239 serves as an aligning member that supports the sheets by contact with the leading edges (lower edges) of the sheets, and that aligns the sheets by regulating the positions of the leading edges.

A description will now be given of a book binding operation of the saddle stitching unit 800 having the above-described configuration.

First, sheets delivered in the storage guide 237 of the saddle stitching unit 800 are conveyed until leading edges thereof come into contact with the sheet positioning member 239 placed at a predetermined binding position, so that the leading edges of the sheets are aligned, and the sheets are set in position.

Subsequently, the sheets are aligned in the width direction orthogonal to the sheet conveying direction, and a predetermined number of sheets, of the aligned sheets, are conveyed as a bundle into the storage guide 237. When a binding mode is set, the bundle of sheets is stapled at the center by the stapling unit 240A in this state.

Then, when the sheet positioning member 239 moves down in accordance with the size of the sheets, the stapled bundle of sheets is thereby moved to a center-folding position.

In this state, the thrust member 241 is thrust against the sheet bundle stored in the storage guide 237 so that the sheet bundle is pushed into a nip between the folding rollers 242 and 243. Consequently, the sheet bundle is folded by the folding rollers 242 and 243. After folding, the thrust member 241 moves away from the folding rollers 242 and 243. The sheet bundle thus folded is discharged onto an output tray 246 along guide plates 247 and 249 via the folding rollers 242 and 243 and discharging rollers 245.

Referring to FIG. 6, an inserter 900 is provided at the top of the finisher 500. The inserter 900 inserts a sheet (insert sheet), which is different from the normal sheet, as a top sheet or a last sheet, or between sheets on which images have been formed by the main unit 300. The inserter 900 supplies sheets set on an inserter tray 901 serving as a sheet stacker to any of the sample tray 701, the processing tray 630, and the storage guide 237 not via the main unit 300.

In this embodiment, cover sheets, insert sheets, or sheets folded beforehand are set face up in a bundle I on the inserter tray 901 by the user. The sheets in the bundle I stacked on the inserter tray 901 are sequentially separated one by one, and are conveyed to the finisher path R1 or the book binding path 234.

Figure 7A:
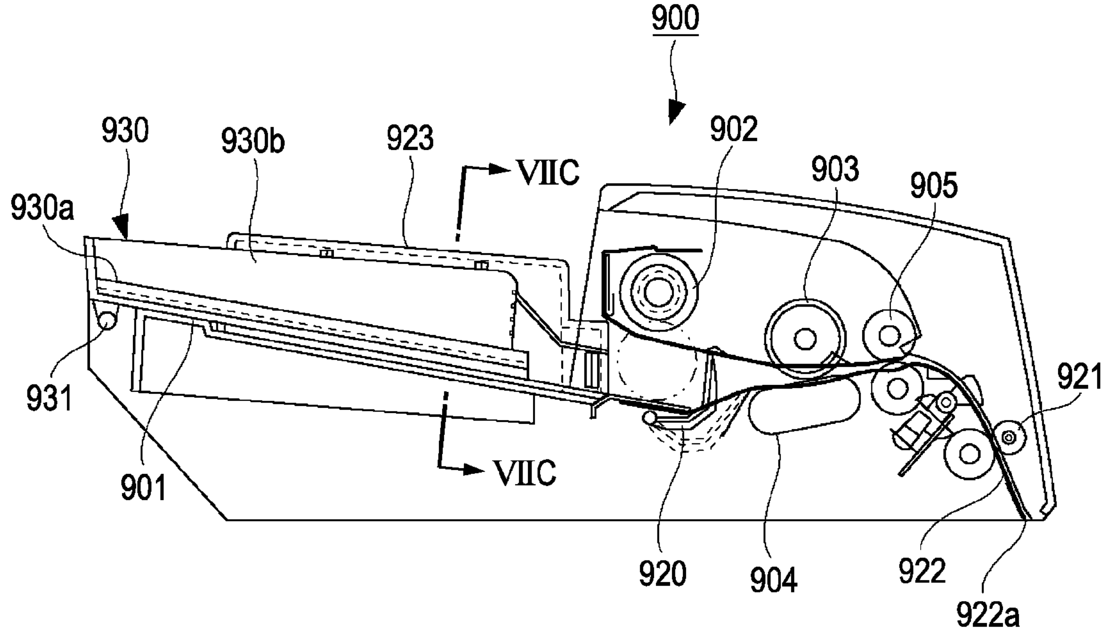
FIG. 7A is a cross-sectional view schematically showing a configuration of an inserter provided in the sheet processing apparatus.
Figure 7B:
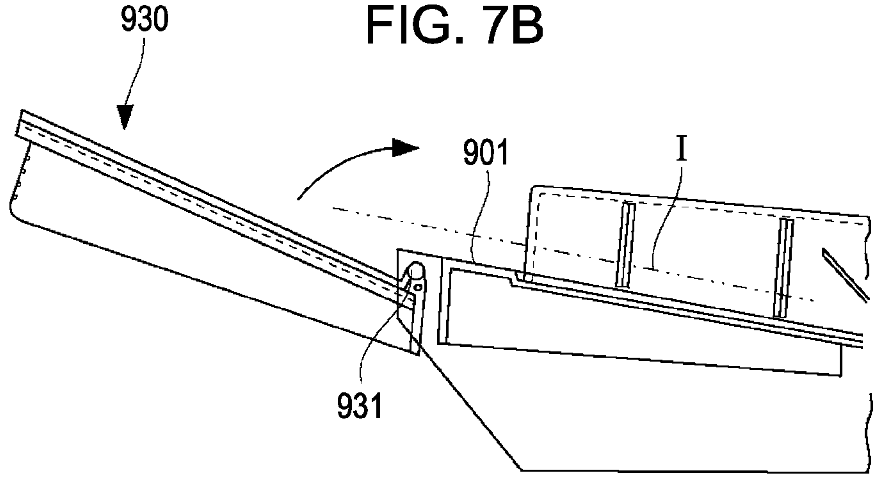
FIG. 7B is a cross-sectional view of the inserter.
Figure 7C:
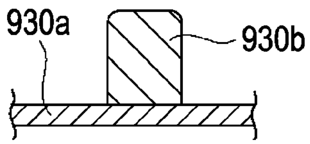
FIG. 7C is a cross-sectional view of the inserter, taken along line VIIC-VIIC in FIG. 7A.

FIGS. 7A to 7C show a configuration of the inserter 900. In the inserter 900, the insert sheets of the bundle I stacked on the inserter tray 901 shown in FIG. 7B are conveyed to a separation unit constituted by a conveying roller 903 and a separation belt 904 by a sheet supply roller 902 serving as a sheet supply portion shown in FIG. 7A. An aligning plate 923 is provided to align the sheets.

After being separated one by one by the separation unit, an insert sheet is first drawn out by a pair of draw-out rollers 905 provided near the separation unit, and is conveyed to a sheet conveying path 922 by conveying rollers 921. Then, the insert sheet is conveyed into an input port 230*a* of a sheet conveying path 230 in the finisher 500 (folding unit 400) (see FIG. 6) through an output port 922*a*.

An auxiliary tray 930 is provided at an end of the inserter tray 901 such as to pivot about a support shaft 931. FIG. 7A shows a state in which the auxiliary tray 930 is closed in a storage position, FIG. 7B shows a state in which the auxiliary tray 930 is open in an operating position, and FIG. 7C is a cross-sectional view, taken along line VIIC-VIIC in FIG. 7A.

During use, the auxiliary tray 930 is pivoted and opened to the operating position, as shown in FIG. 7B. The auxiliary tray 930 includes a stacking plate 930*a* and a rib 930*b* provided integrally with a back surface of the stacking plate 930*a*. The height of the rib 930*b* shown in FIG. 7C is set so as to inhibit the insert sheet from being supplied when the auxiliary tray 930 is in the storage position shown in FIG. 7A.

Accordingly, when the auxiliary tray 930 is closed (placed in a storage state), as shown in FIG. 7A, it is impossible to place the insert sheet on the inserter tray 901. Therefore, the auxiliary tray 930 needs to be opened in order to use the inserter tray 901.

Since sheet supply is impossible when the auxiliary tray 930 is closed, sheet supply failure can be prevented from being caused when a large-sized sheet is supplied in a state in which the user fails to open the auxiliary tray 930.

The rib 930*b* can function as a grip that helps to pivot the auxiliary tray 930. Further, by closing the auxiliary tray 930 when the image forming apparatus is not used, the size of the apparatus can be reduced, and the sample tray 701 (FIG. 6) disposed therebelow can be seen more plainly.

Figure 8:
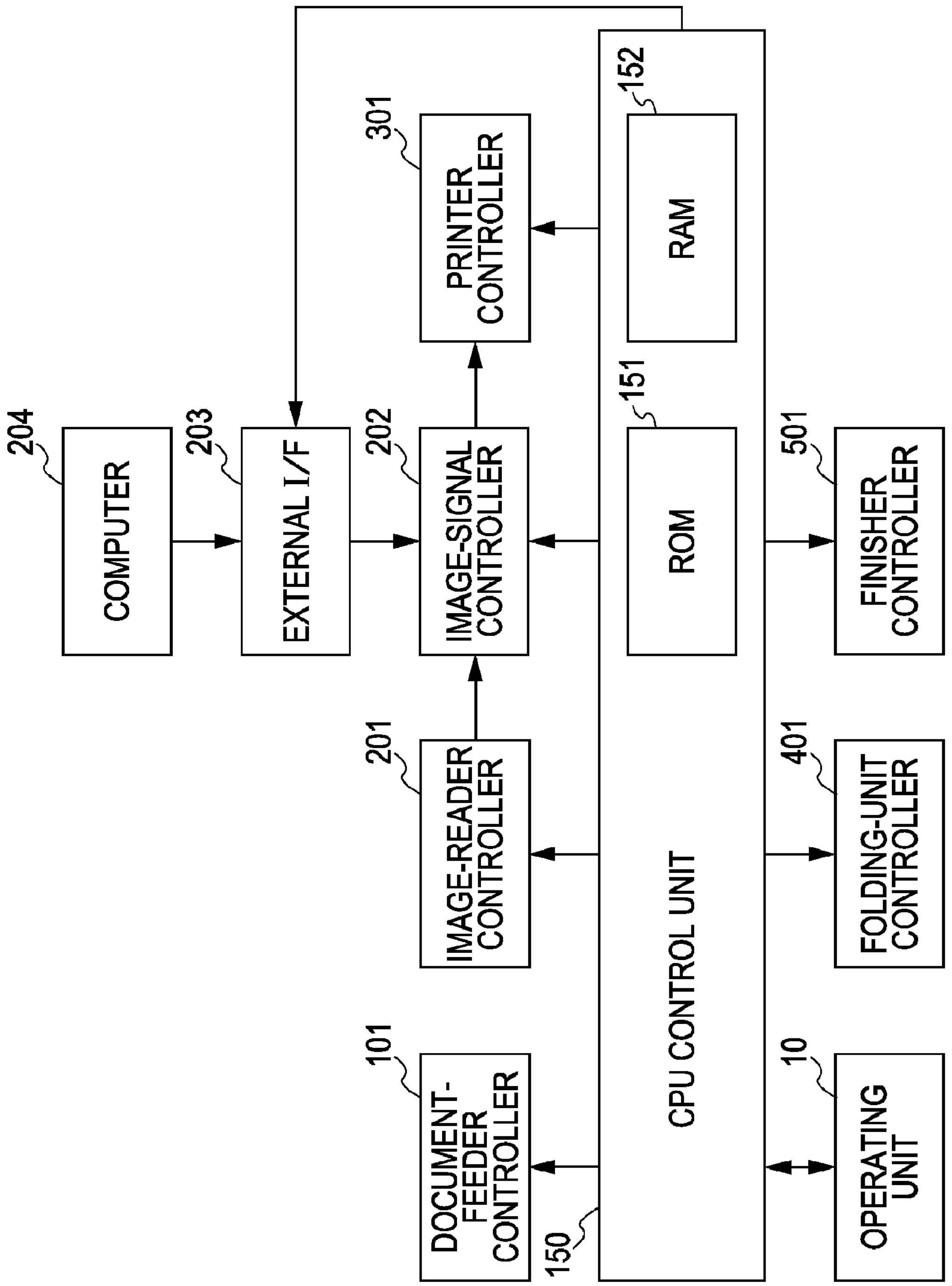
FIG. 8 is a control block diagram of the copying machine.

FIG. 8 is a block diagram of the copying machine 1000. In the copying machine 1000, a CPU circuit unit 150 serving as a control unit includes a CPU (not shown), a ROM 151 that stores a control program and so on, and a RAM 152 that is used as an area for temporarily retaining control data and a working area for control operation.

An external I/F 203 is an interface between the copying machine 1000 and an external computer 204. When the external I/F 203 receives print data from the computer 204, it expands the data into a bit map image, and outputs the bit map image as image data to an image-signal controller 202.

The image-signal controller 202 outputs the image data to a printer controller 301. The printer controller 301 outputs the data from the image-signal controller 202 to the exposure controller 110 (FIG. 1). A document image read by the image sensor 109 (FIG. 1) is output from an image-reader controller 201 to the image-signal controller 202. The image-signal controller 202 outputs the document image to the printer controller 301.

Figure 9:
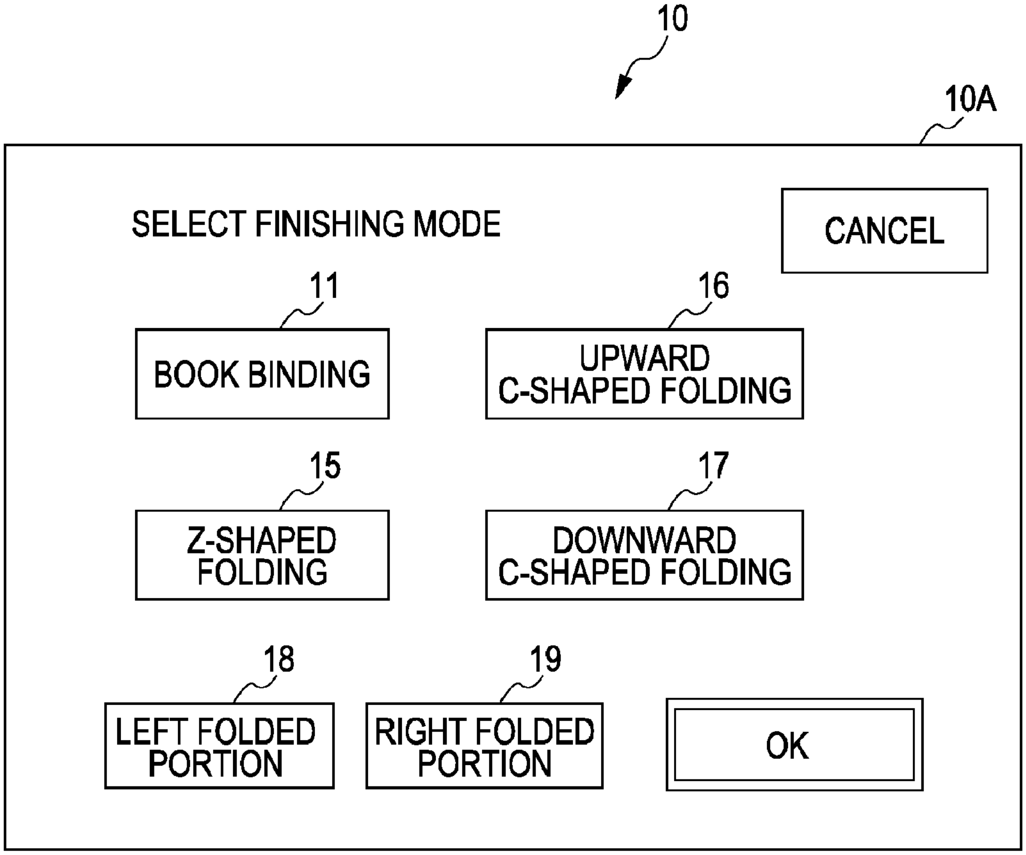
FIG. 9 is an explanatory view of a display on a display section of an operating unit provided in the copying machine.

An operating unit 10 includes a plurality of keys for setting various functions for image formation, and a display section 10A serving as a selector for displaying a setting state, as shown in FIG. 9. The operating unit 10 outputs a key signal corresponding to a key operation performed by the user to the CPU circuit unit 150, and displays information corresponding to a signal from the CPU circuit unit 150 on the display section 10A.

The CPU circuit unit 150 controls the image-signal controller 202 according to the control program stored in the ROM 151 and the setting of the operating unit 10, and controls the document feeder 100 via a document-feeder controller 101. The CPU circuit unit 150 also controls the image reader 200 via the image-reader controller 201, the main unit 300 via the printer controller 301, the folding unit 400 via a folding-unit controller 401, and the finisher 500 via a finisher controller 501.

In the copying machine 1000 of this embodiment, the user can select a side of a spread of a booklet on which a folded portion is provided. Image formation, sheet folding, and making of a booklet including a folded sheet can be performed automatically.

In order to make a booklet including a folded sheet, a book binding button 11 on the display section 10A of the operating unit 10 shown in FIG. 9 is first pressed, and one of a Z-shaped folding button 15, an upward C-shaped folding button 16, and a downward C-shaped folding button 17 is then pressed. When the book binding button 11 and one of the folding buttons 15, 16, and 17 are pressed in this way, the CPU circuit unit 150 recognizes that a mode for making a booklet including a folded sheet is selected.

Subsequently, the user presses a left folded portion button 18 or a right folded portion button 19 so as to determine whether a folded portion should be provided on the right or left side of a spread of the booklet. When the left folded portion button 18 is pressed, the CPU circuit unit 150 directs the printer controller 301, via the image-signal controller 202, to perform exposure with all images reversed vertically.

When the upward C-shaped folding button 16 is pressed, a signal for laterally reversing only an image on a sheet to be folded is transmitted from the CPU circuit unit 150 to the printer controller 301 via the image-signal controller 202. Subsequently, a sheet folded by the folding unit 400 is conveyed into the saddle stitching unit 800, and an operation of making a booklet including the folded sheet is started.

Figure 10:
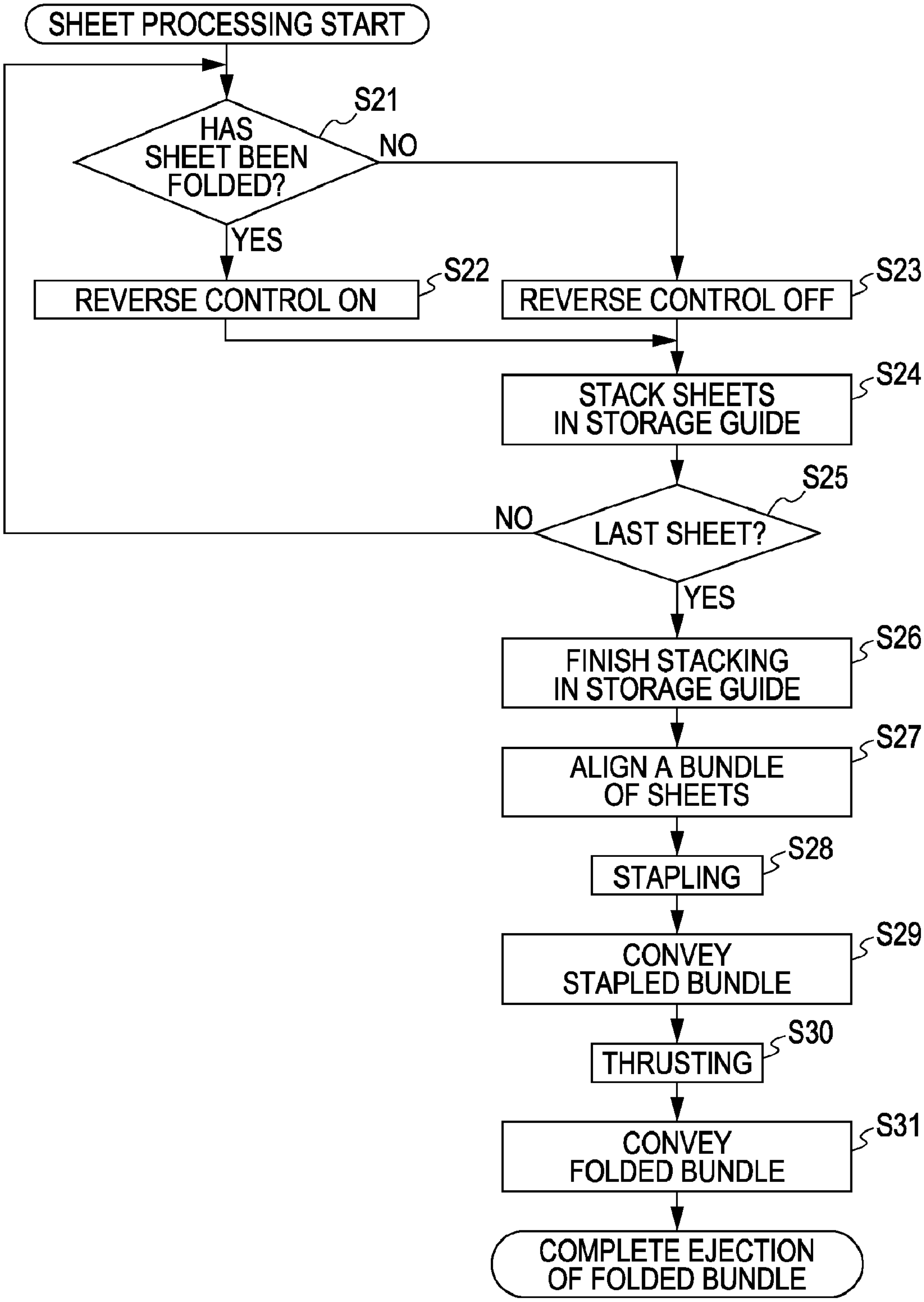
FIG. 10 is a flowchart showing a folded-sheet-contained booklet mode in the sheet processing apparatus.

Referring to a flowchart shown in FIG. 10, a description will now be given of the mode for making a booklet including a folded sheet.

When a sheet is put into the finisher 500, the CPU circuit unit 150 determines whether the sheet has been folded by the folding unit 400 (Step S21). When the sheet has been folded (Y of Step S21), the CPU circuit unit 150 selects a reverse control mode via the finisher controller 501 (Step S22), and controls the reversing unit 233 (FIG. 6) so as to reverse the sheet. Consequently, the folded sheet is put in the storage guide 237 (Step S24).

When the sheet has not been folded (N of Step S21), the CPU circuit unit 150 cancels the reverse control mode via the finisher controller 501 (Step S23), and controls the reversing unit 233 so that the sheet is conveyed into the storage guide 237 without being reversed (Step S24).

In this way, the stacking operation of stacking the sheet in the storage guide 237 is repeated. When the last sheet is stacked (Y of Step S25), the stacking operation is completed (Step S26).

Next, the CPU circuit unit 150 controls the operation of the width-direction aligning plate 244, via the finisher controller 501, so as to align a bundle of sheets stacked in the storage guide 237 (Step S27), and controls the stapling unit 240A so as to perform stapling (Step S28). Further, the CPU circuit unit 150 exerts control via the finisher controller 501 so that the sheet positioning member 239 is moved to the position in accordance with the sheet size, thereby conveying the bundle of sheets to the thrust position (Step S29). Subsequently, the CPU circuit unit 150 controls the thrust member 241 so as to perform thrusting (Step S30). The CPU circuit unit 150 controls the folding rollers 242 and 243 and the discharging rollers 245, via the finisher controller 501, so as to convey the bundle of sheets (Step S31). Finally, the bundle of sheets is discharged onto the output tray 246.

A description will now be given of an operation of reversing a folded sheet and an operation of aligning a bundle of sheets.

Figure 11A:
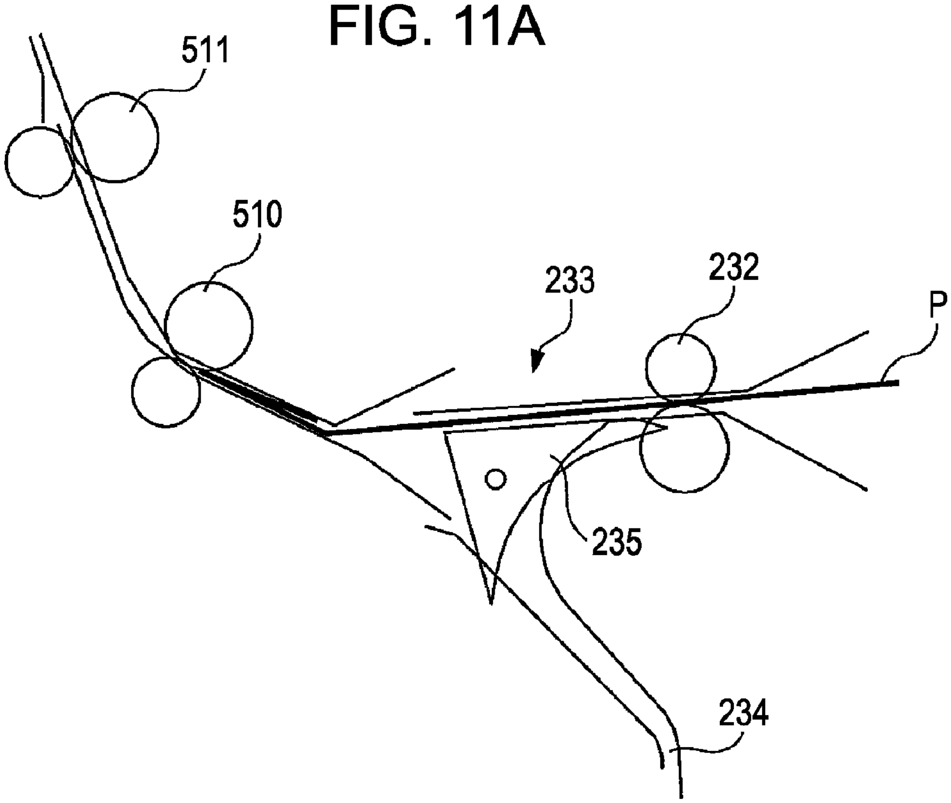
FIG. 11A is an explanatory view showing a folded-sheet reversing operation of a reversing unit provided in the sheet processing apparatus showing a state before the folded-sheet reversing operation.
Figure 11B:
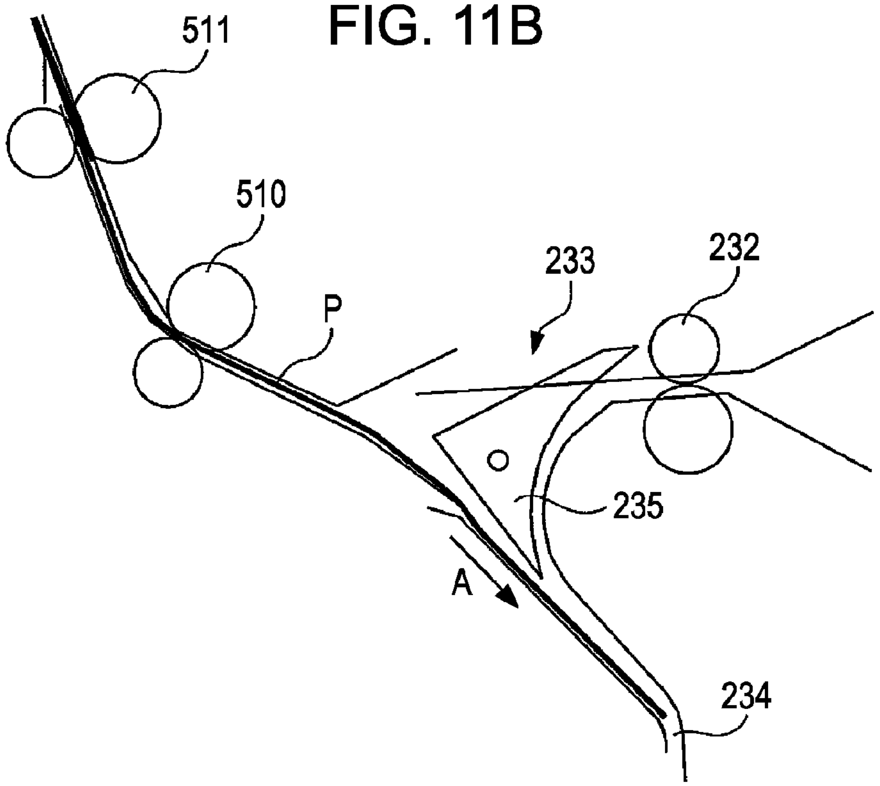
FIG. 11B is an explanatory view showing the folded-sheet reversing operation of the reversing unit showing a state after the folded-sheet reversing operation.

The reversing unit 233 includes the pairs of conveying rollers 510 and 511 that are rotatable clockwise and anticlockwise (i.e. forward and in reverse), and the flapper 235, as shown in FIGS. 11A and 11B. As described above, when a reverse control mode is selected, first, the flapper 235 is switched to a position shown in FIG. 11A, and a sheet P is conveyed with a folded portion at the forefront thereof by the conveying rollers 510 and 511.

When a rear edge of the sheet P passes through the flapper 235, the flapper 235 is switched to a position shown in FIG. 11B, and the pairs of conveying rollers 510 and 511 are rotated in reverse. Consequently, the sheet P is conveyed toward the storage guide 237 in the direction of arrow A in FIG. 11B. In this embodiment, both rollers that form the pair of conveying rollers 510 are driven by a motor (not shown) in order to prevent displacement of the folded portion. Both rollers that form the pair of conveying rollers 511 are also driven by the motor.

Figure 12:
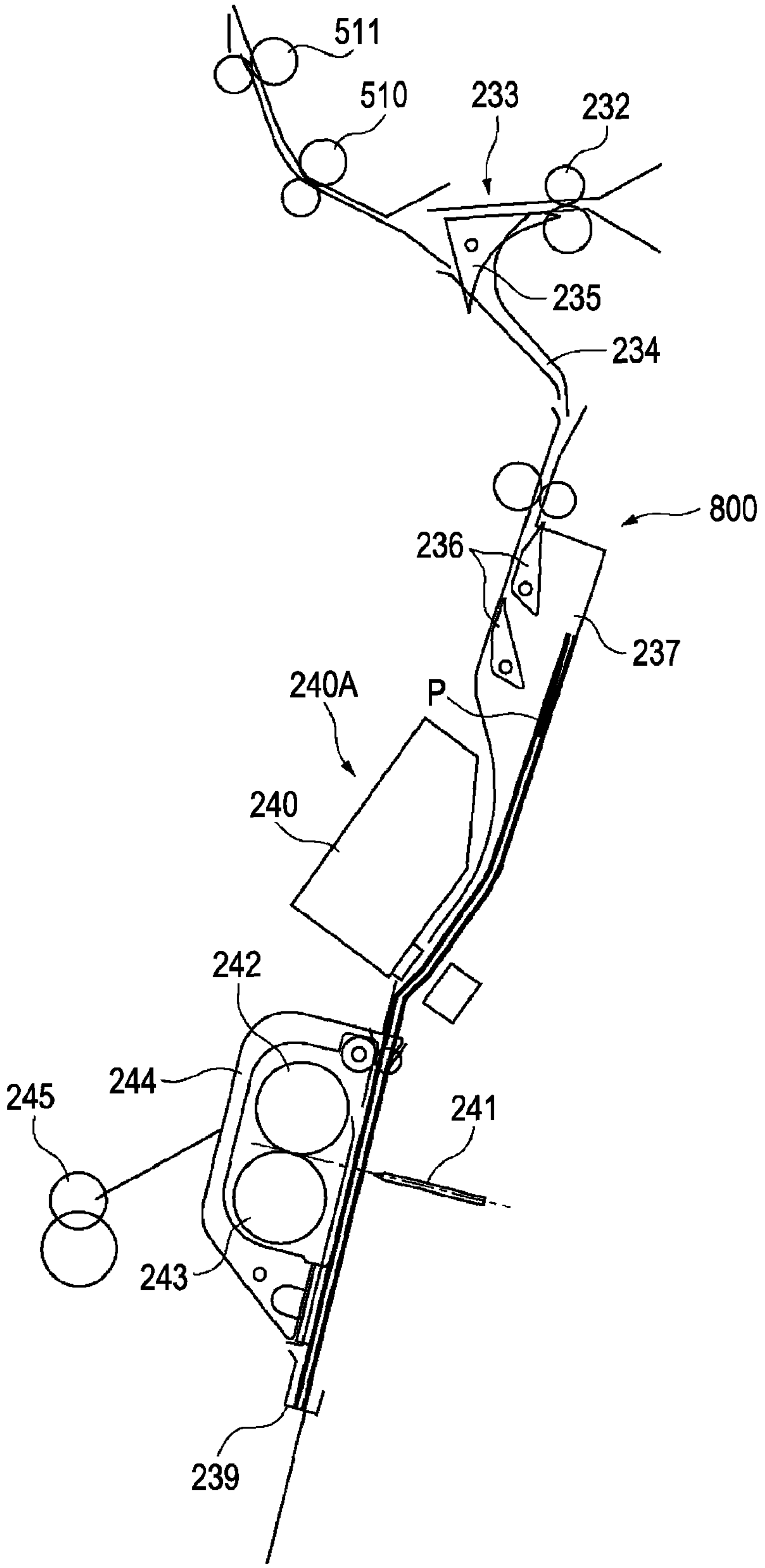
FIG. 12 is an explanatory view showing a state in which a sheet folded in an upward C-shape is mixed in a saddle stitching unit provided in the sheet processing apparatus.

For example, when a sheet P, which has been folded in an upward C-shape by the folding unit 400, is put into the storage guide 237, it is conveyed with a folded portion at the tail end until a leading edge of the sheet comes into contact with the sheet positioning member 239, as shown in FIG. 12.

In this case, the sheet positioning member 239 aligns a bundle of sheets by contact with ends of the sheets opposite to the folded portion. Accordingly, even when the folding accuracy of the folded sheet is low, it does not decrease the accuracy in aligning the bundle of sheets stored in the storage guide 237.

Subsequently, the bundle of sheets stored in the storage guide 237 is aligned in the width direction orthogonal to the sheet conveying direction by the width-direction aligning plate 244 serving as the width-direction aligning member that is movable in the width direction. The width-direction aligning plate 244 is provided at the lower end of the bundle of sheets stored in the storage guide 237, and aligns the bundle of sheets without contact with the folded portion of the folded sheet (in the width-direction) and in contact with an end of the folded sheet other than the folded portion. Since the width-direction aligning plate 244 always pushes the end of the folded sheet other than the folded portion, the bundle of sheets including the folded sheet can be aligned with an accuracy similar to that for normal sheets.

Figure 13:
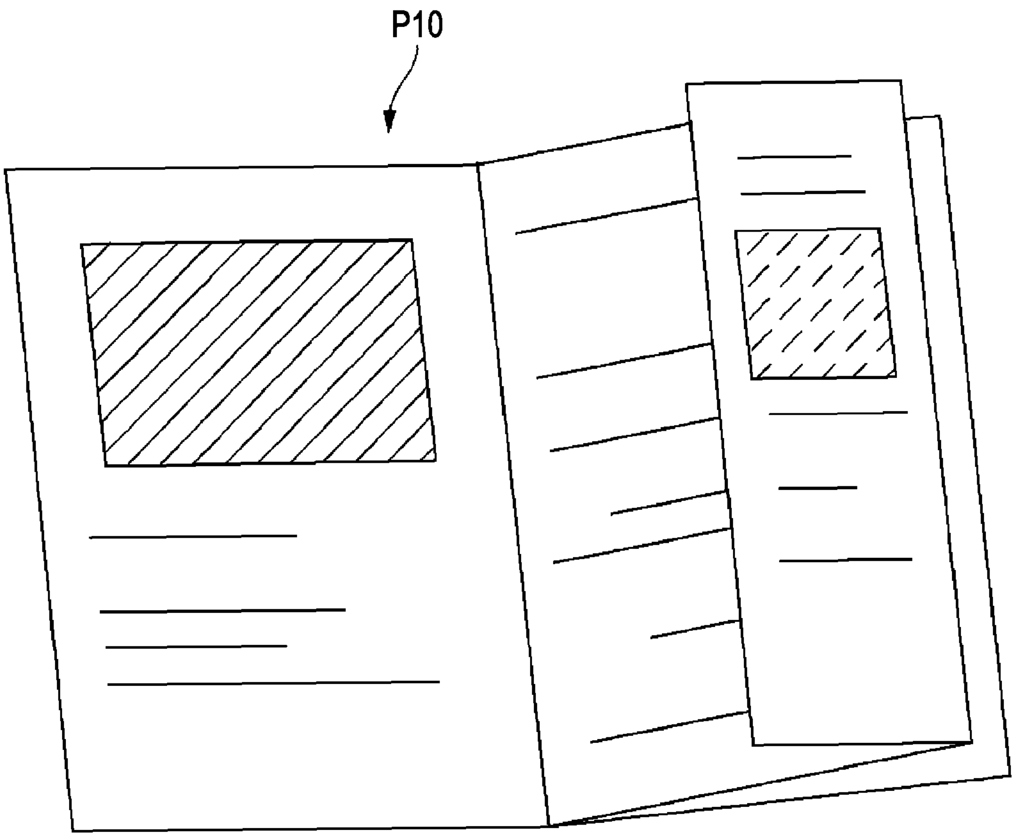
FIG. 13 is an explanatory view showing a state in which a bundle of sheets including the upward C-shaped folded sheet is bound.

After the aligned bundle of sheets is stapled by the stapling unit 240A, it is moved to the center-folding position by moving the sheet positioning member 239. The thrust member 241 is then thrust against the bundle of sheets stored in the storage guide 237 so that the bundle of sheets is folded by the folding rollers 242 and 243. The folded bundle of sheets is discharged onto the output tray 246 via the folding rollers 242 and 243 and the discharging rollers 245. By binding the bundle of sheets including the upward C-shaped folded sheet, a booklet P10 is completed, as shown in FIG. 13.

Figure 14:
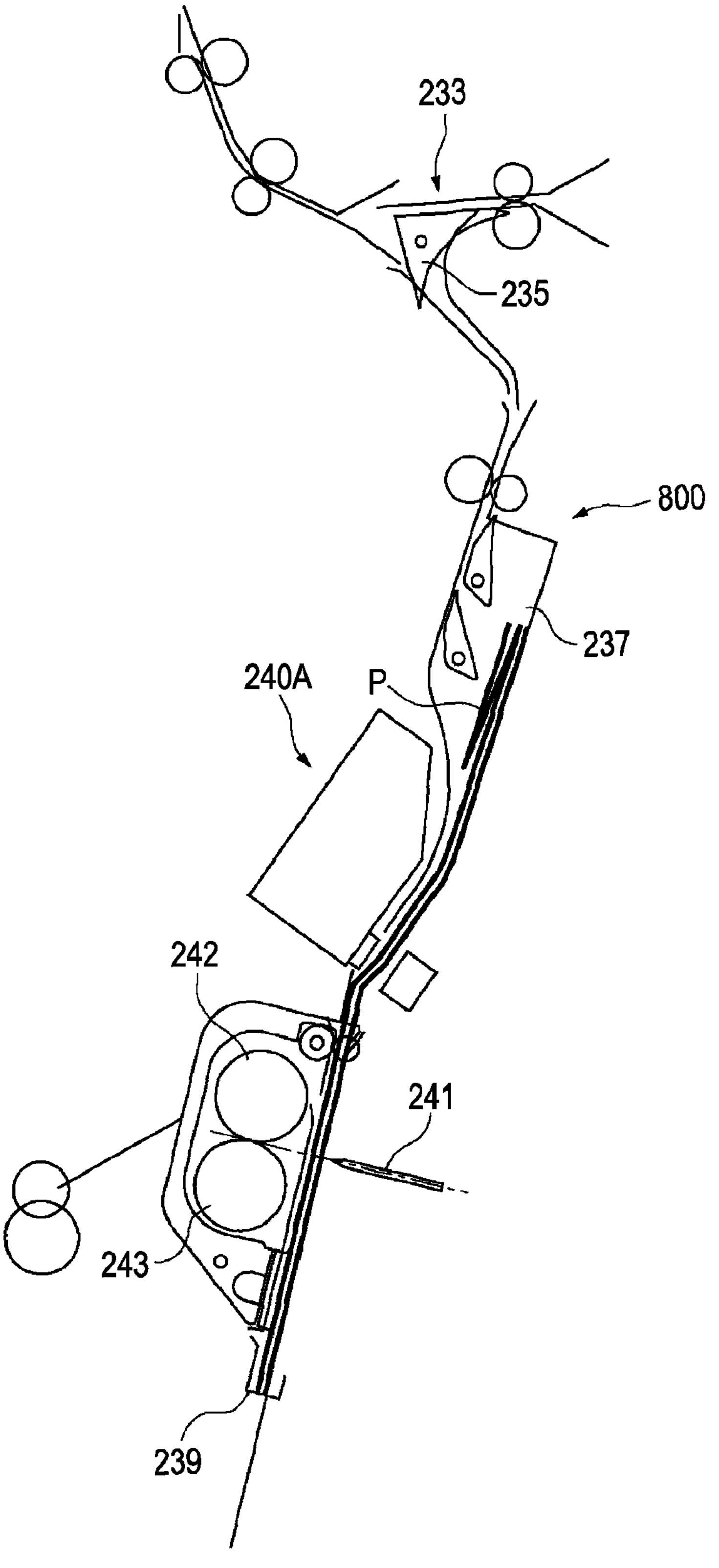
FIG. 14 is an explanatory view showing a state in which a sheet folded in a Z-shape is mixed in the saddle stitching unit.

A sheet P folded in a Z-shape by the folding unit 400 is also reversed by the reversing unit 233, and is conveyed with a folded portion at the tail end until a leading edge of the sheet comes into contact with the sheet positioning member 239, as shown in FIG. 14.

Figure 15:
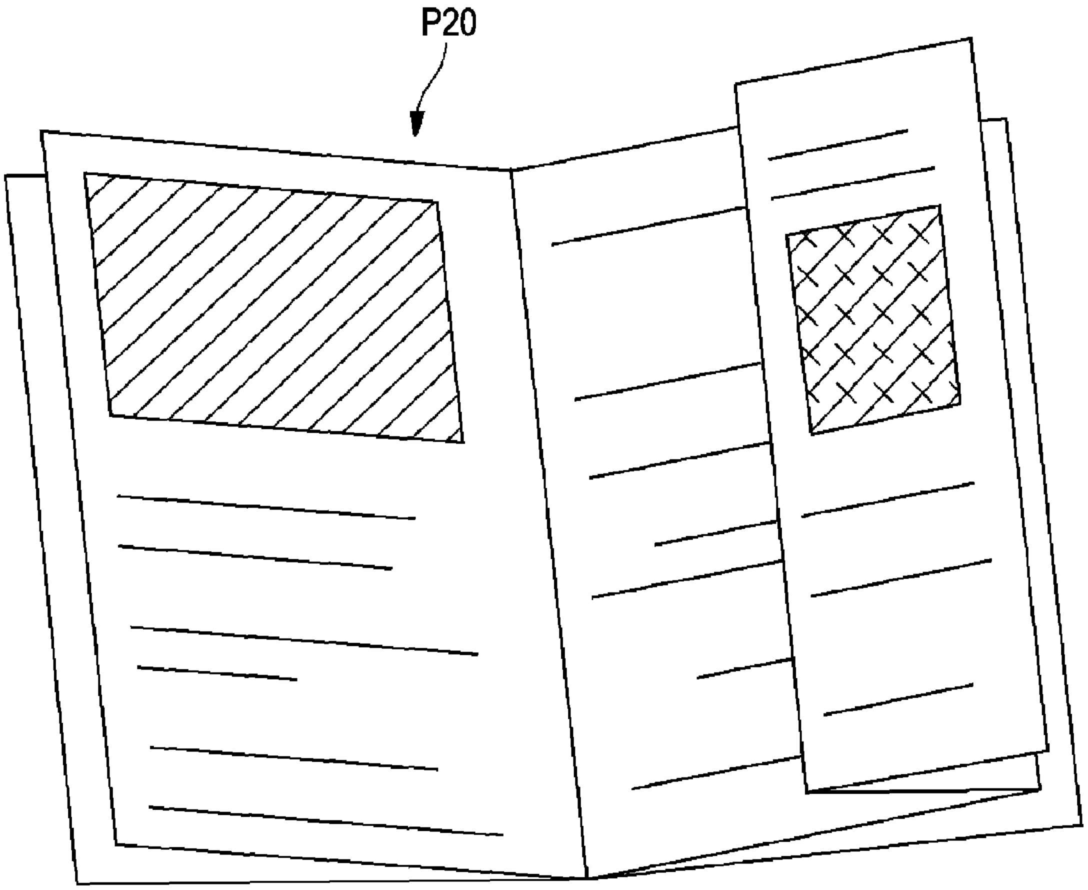
FIG. 15 is an explanatory view showing a state in which a bundle of sheets including the Z-shaped folded sheet is bound.

After sheet stacking is completed, a bundle of sheets including the folded sheet P is aligned by the width-direction aligning plate 244, and is stapled. Subsequently, the bundle of sheets is conveyed to the thrust position by moving the sheet positioning member 239, and is folded by thrusting the thrust member 241. The folded bundle of sheets is then conveyed and discharged onto the output tray 246. By binding the bundle of sheets including the Z-shaped folded sheet, a booklet P20 is completed, as shown in FIG. 15.

Figure 16:
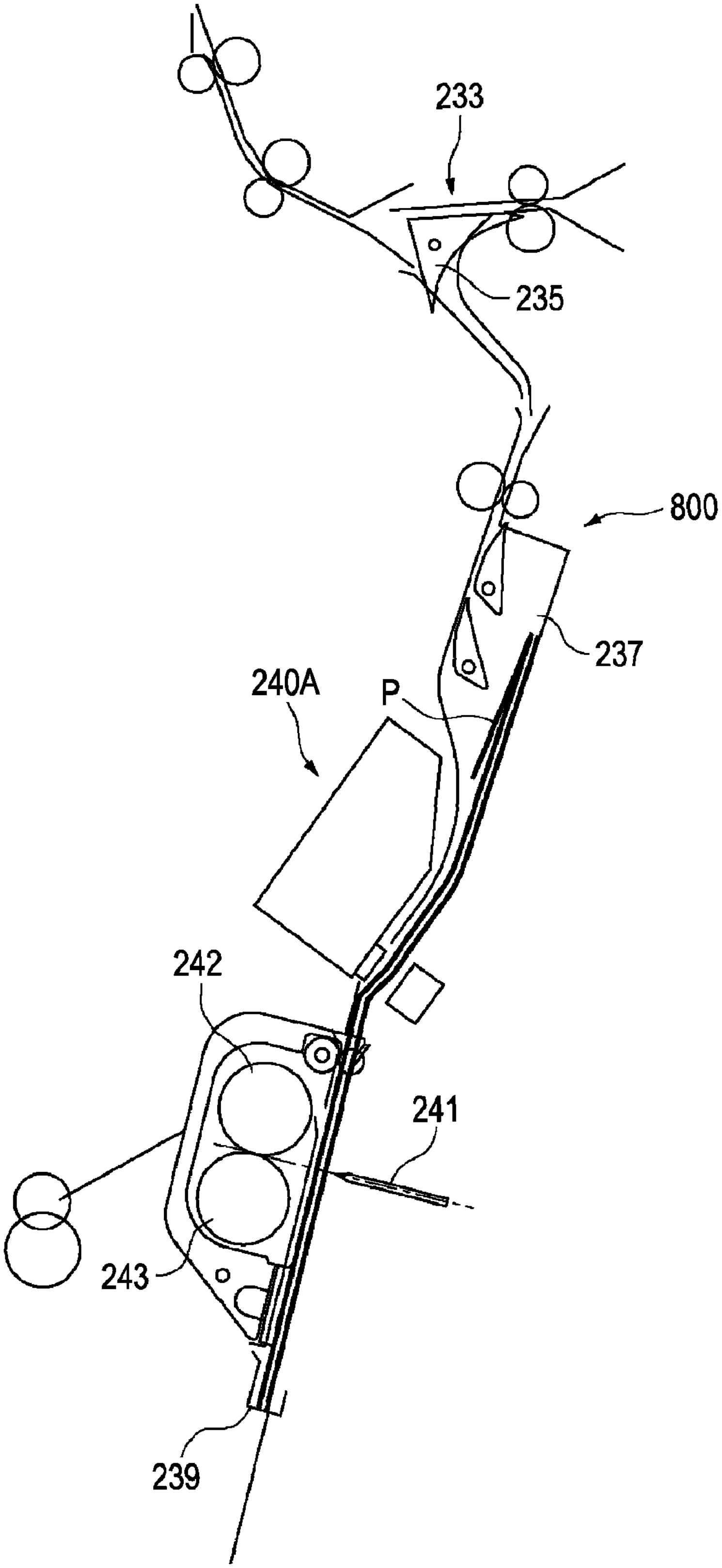
FIG. 16 is an explanatory view showing a state in which a sheet folded in a downward C-shape is mixed in the saddle stitching unit.

A sheet P folded in a downward C-shape by the folding unit 400 is also reversed by the reversing unit 233, and is conveyed with a folded portion at the tail end until a leading edge thereof comes into contact with the sheet positioning member 239, as shown in FIG. 16.

Figure 17:
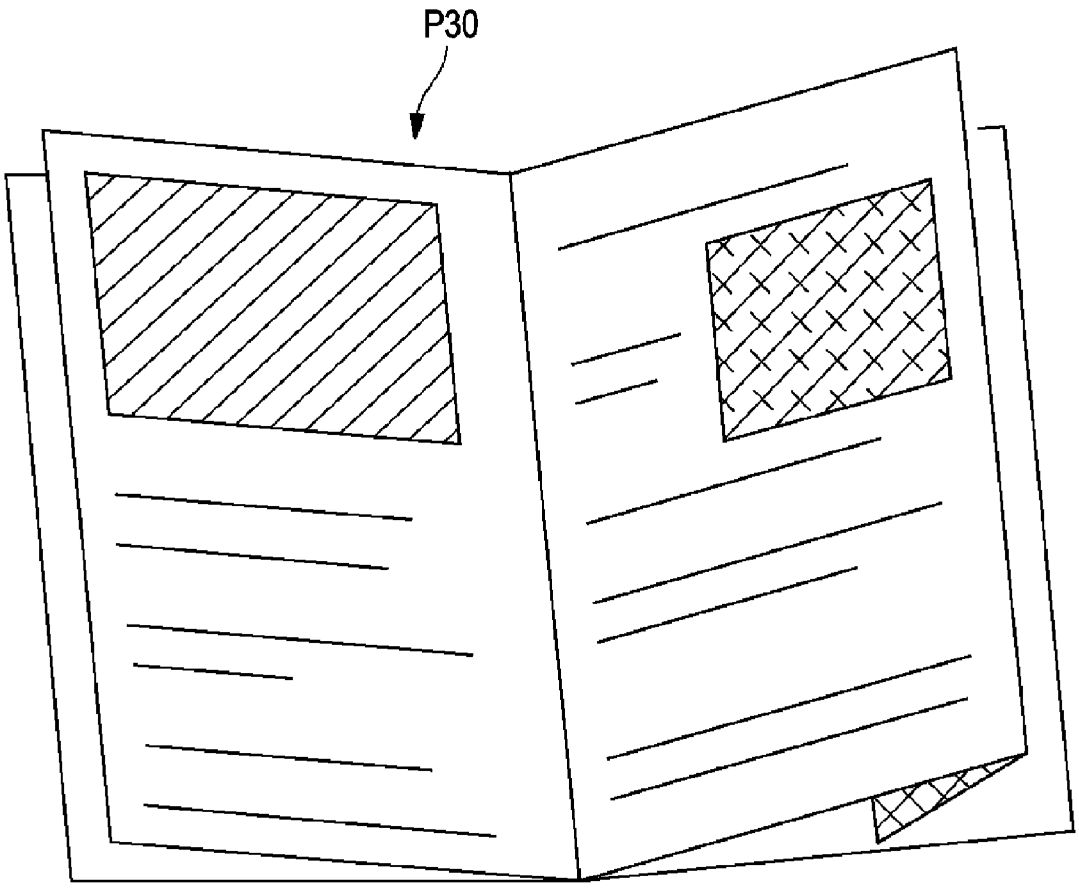
FIG. 17 is an explanatory view showing a state in which a bundle of sheets including the downward C-shaped folded sheet is bound.

After sheet stacking is completed, a bundle of sheets including the folded sheet P is aligned by the width-direction aligning plate 244, and is stapled. Subsequently, the bundle of sheets is conveyed to the thrust position by moving the sheet positioning member 239, and is folded by thrusting the thrust member 241. The folded bundle of sheets is then conveyed and discharged onto the output tray 246. By binding the bundle of sheets including the sheet folded in a downward C-shape, a booklet P30 is completed, as shown in FIG. 17.

In this way, a sheet folded by the folding unit 400 is reversed by the reversing unit 233, and is conveyed with a folded portion at the tail end until the leading edge thereof comes into contact with the sheet positioning member 239. Since the leading edge of the sheet comes into contact with the sheet positioning member 239 in a state in which the folded portion is at the tail end or trailing edge, the quality of a booklet obtained by binding a bundle of sheets including the folded sheet can be improved.

While the case in which the sheet folded by the folding unit 400 is reversed by the reversing unit 233 has been described above, the present invention is not limited to the above case. In a case in which a sheet folded beforehand is supplied from the inserter 900 and a booklet including the folded sheet is made, the folded sheet is also reversed by the reversing unit 233, and is conveyed with its folded portion at the tail end into the saddle stitching unit 800. This allows a bundle of sheets including the folded sheet to be bound with high quality. In the above case in which the folded sheet is supplied from the inserter 900, the user may be informed by the display section 10A about the orientation of the folded sheet set on the inserter tray 901 of the inserter 900 (whether the folded portion is placed on the upstream side or the downstream side). In this case, the orientation of the folded sheet refers to an orientation that allows the supplied folded sheet to be conveyed so that an end of the folded sheet opposite to the folded portion engages with the sheet positioning member 239.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-161536 filed Jun. 9, 2006, which is hereby incorporated by reference herein in its entirety.

What is claimed is:

1. A sheet processing apparatus comprising:

a sheet storing unit configured to store a bundle of sheets including at least one folded sheet having a folded portion;

a first aligning member configured to align respective edges of sheets of the bundle of sheets stored in the sheet storing unit by engaging with the edges of the bundle of sheets;

a conveying unit configured to convey the folded sheet into the sheet storing unit so that the edge of the folded sheet, which is engaged with the first aligning member, is opposite to the folded portion of the folded sheet;

a second aligning member configured to align the bundle of sheets stored in the sheet storing unit in a width direction crossing to a sheet conveying direction of the conveying unit; and a sheet processing unit configured to process the bundle of sheets that has been aligned by the first aligning member and the second aligning member, wherein the sheet processing unit is configured to fold the bundle of sheets that has been aligned by the first aligning member and the second aligning member, and wherein the second aligning member is movable in the width direction so as to align the bundle of sheets in the width direction without contact with the folded portion of the folded sheet and in contact with a portion of the folded sheet other than the folded portion thereof.

2. The sheet processing apparatus according to claim 1, wherein the sheet storing unit stores the bundle of sheets in a substantially upright position with the folded portion of the folded sheet at the upper end of the bundle, and wherein the first aligning member aligns the edges at the lower end of the said bundle of sheets in the sheet storing unit.

3. The sheet processing apparatus according to claim 1, further comprising:

a sheet folding unit configured to fold a sheet, wherein the conveying unit conveys the sheet that has been folded by the sheet folding unit into the sheet storing unit, wherein the conveying unit conveys the folded sheet into the sheet storing unit so that the edge thereof, which engages with the first aligning member, is the edge of the folded sheet opposite to the folded portion of the sheet.

4. The sheet processing apparatus according to claim 3, wherein the conveying unit includes a reversing unit configured to reverse a conveying direction of the folded sheet, and wherein the conveying unit receives the folded sheet from the sheet folding unit in a state in which the folded portion of the folded sheet is at the leading edge, and the reversing unit reverses the conveying direction of the folded sheet so that the folded portion of the folded sheet is at the trailing edge and the edge of the folded sheet opposite to the folded portion is at the leading edge, and the conveying unit conveys the folded sheet into the sheet storing unit after said reversing so that the edge of the folded sheet opposite to the folded portion engages with the first aligning member.

5. An image forming apparatus comprising:

an image forming unit configured to form an image on a sheet;

the sheet processing apparatus according to claim 3, the sheet processing apparatus being configured to process the sheet on which the image is formed by the image forming unit;

a selection unit configured to select a folding manner in which the sheet is folded by the sheet folding unit; and a control unit configured to determine an image forming position on the sheet in accordance with the folding manner of the sheet selected by the selection unit.

6. The sheet processing apparatus according to claim 1, wherein the second aligning member is provided at the lower end of the bundle of sheets stored in the sheet storing unit and is movable in the width direction so as to align the bundle of sheets.

7. The sheet processing apparatus according to claim 1, wherein the first aligning member also functions as a positioning member configured to engage with the edge of the folded sheet so as to position the bundle of sheets including the folded sheet relative to the sheet processing unit.

8. The sheet processing apparatus according to claim 1, wherein the sheet processing unit includes a binding unit configured to bind the bundle of sheets that has aligned by the first aligning member and the second aligning member.

9. The sheet processing apparatus according to claim 1, further comprising:

a sheet feeding unit configured to feed the folded sheet set on a tray, wherein the sheet conveying unit conveys the folded sheet fed by the sheet feeding unit to the first aligning member; and a display unit configured to display an orientation in which the folded sheet is set on the tray, the orientation allowing the edge of the folded sheet opposite to the folded portion to engage with the first aligning member when the folded sheet is conveyed to the first aligning member by the sheet conveying unit.

10. An image forming apparatus comprising:

an image forming unit configured to form an image on a sheet; and a sheet processing apparatus according to claim 1, the sheet processing apparatus being configured to process the sheet on which the image is formed by the image forming unit.

11. A sheet processing apparatus comprising:

a sheet storing unit configured to store a bundle of sheets including at least one folded sheet having a folded portion;

a first aligning member configured to align respective edges of sheets of the bundle of sheets stored in the sheet storing unit by engaging with the edges of the bundle of sheets;

a conveying unit configured to convey the folded sheet into the sheet storing unit so that the edge of the folded sheet, which is engaged with the first aligning member, is opposite to the folded portion of the folded sheet;

a second aligning member configured to align the bundle of sheets stored in the sheet storing unit in a width direction crossing to a sheet conveying direction of the conveying unit; and a sheet processing unit configured to process the bundle of sheets that has been aligned by the first aligning member and the second aligning member, wherein the sheet processing unit includes a binding unit configured to bind the bundle of sheets that has aligned by the first aligning member and the second aligning member, wherein the second aligning member is movable in the width direction so as to align the bundle of sheets in the width direction without contact with the folded portion of the folded sheet and in contact with a portion of the folded sheet other than the folded portion thereof.

12. The sheet processing apparatus according to claim 11, wherein the sheet storing unit stores the bundle of sheets in a substantially upright position with the folded portion of the folded sheet at the upper end of the bundle, and wherein the first aligning member aligns the edges at the lower end of the said bundle of sheets in the sheet storing unit.

13. The sheet processing apparatus according to claim 11, further comprising:

a sheet folding unit configured to fold a sheet, wherein the conveying unit conveys the sheet that has been folded by the sheet folding unit into the sheet storing unit, wherein the conveying unit conveys the folded sheet into the sheet storing unit so that the edge thereof, which engages with the first aligning member, is the edge of the folded sheet opposite to the folded portion of the sheet.

14. The sheet processing apparatus according to claim 13, wherein the conveying unit includes a reversing unit configured to reverse a conveying direction of the folded sheet, and wherein the conveying unit receives the folded sheet from the sheet folding unit in a state in which the folded portion of the folded sheet is at the leading edge, and the reversing unit reverses the conveying direction of the folded sheet so that the folded portion of the folded sheet is at the trailing edge and the edge of the folded sheet opposite to the folded portion is at the leading edge, and the conveying unit conveys the folded sheet into the sheet storing unit after said reversing so that the edge of the folded sheet opposite to the folded portion engages with the first aligning member.

15. An image forming apparatus comprising:

an image forming unit configured to form an image on a sheet;

the sheet processing apparatus according to claim 13, the sheet processing apparatus being configured to process the sheet on which the image is formed by the image forming unit;

a selection unit configured to select a folding manner in which the sheet is folded by the sheet folding unit; and a control unit configured to determine an image forming position on the sheet in accordance with the folding manner of the sheet selected by the selection unit.

16. The sheet processing apparatus according to claim 11, wherein the second aligning member is provided at the lower end of the bundle of sheets stored in the sheet storing unit and is movable in the width direction so as to align the bundle of sheets.

17. The sheet processing apparatus according to claim 11, wherein the first aligning member also functions as a positioning member configured to engage with the edge of the folded sheet so as to position the bundle of sheets including the folded sheet relative to the sheet processing unit.

18. The sheet processing apparatus according to claim 11, wherein the sheet processing unit folds the bundle of sheets that has been aligned by the first aligning member and the second aligning member.

19. The sheet processing apparatus according to claim 11, further comprising:

a sheet feeding unit configured to feed the folded sheet set on a tray, wherein the sheet conveying unit conveys the folded sheet fed by the sheet feeding unit to the first aligning member; and a display unit configured to display an orientation in which the folded sheet is set on the tray, the orientation allowing the edge of the folded sheet opposite to the folded portion to engage with the first aligning member when the folded sheet is conveyed to the first aligning member by the sheet conveying unit.

20. An image forming apparatus comprising:

an image forming unit configured to form an image on a sheet; and a sheet processing apparatus according to claim 11, the sheet processing apparatus being configured to process the sheet on which the image is formed by the image forming unit.

* * * * *